(12) United States Patent
Chen et al.

(10) Patent No.: US 10,620,482 B2
(45) Date of Patent: Apr. 14, 2020

(54) DISPLAY DEVICE

(71) Applicant: Au Optronics Corporation, Hsinchu (TW)

(72) Inventors: Ju-Chin Chen, Taipei (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 42 days.

(21) Appl. No.: 16/027,376

(22) Filed: Jul. 5, 2018

(65) Prior Publication Data

US 2019/0302543 A1 Oct. 3, 2019

(30) Foreign Application Priority Data

Apr. 2, 2018 (TW) .............................. 107111600 A

(51) Int. Cl.
*G02F 1/1337* (2006.01)
*G02F 1/1343* (2006.01)

(52) U.S. Cl.
CPC .. *G02F 1/133784* (2013.01); *G02F 1/133723* (2013.01); *G02F 1/134309* (2013.01); *G02F 2001/134318* (2013.01); *G02F 2001/134345* (2013.01); *G02F 2001/134381* (2013.01); *G02F 2201/123* (2013.01); *G02F 2203/01* (2013.01)

(58) Field of Classification Search
CPC ................................................ G02F 1/133784
See application file for complete search history.

(56) References Cited

U.S. PATENT DOCUMENTS

| 7,193,674 B2 | 3/2007 | Hong | |
|---|---|---|---|
| 2007/0242028 A1 | 10/2007 | Kitagawa et al. | |
| 2008/0088649 A1 | 4/2008 | Ikeno et al. | |
| 2008/0129899 A1* | 6/2008 | Sharp | G02B 27/28 349/13 |
| 2010/0091204 A1* | 4/2010 | Chen | G02B 27/2214 349/15 |
| 2012/0062527 A1* | 3/2012 | Cheong | G02F 1/1347 345/204 |

(Continued)

FOREIGN PATENT DOCUMENTS

| TW | 200809328 | 2/2008 |
|---|---|---|
| TW | 200829985 | 7/2008 |
| TW | I553104 | 10/2016 |

*Primary Examiner* — Sang V Nguyen
(74) *Attorney, Agent, or Firm* — JCIPRNET

(57) ABSTRACT

A display device includes a first substrate, a second substrate, a plurality of first liquid crystal molecules, a plurality of pixel structures, a third substrate, a fourth substrate, a plurality of second liquid crystal molecules, a plurality of light valves and a backlight source. Each of the plurality of pixel structures includes a pixel electrode and a common electrode. At least one of the pixel electrode and the common electrode includes a plurality of first branches extended along a first extending direction. Each of the plurality of light valves includes a first electrode and a second electrode. At least one of the first electrode and the second electrode includes a plurality of second branches extended along a second extending direction. The plurality of first branches and the plurality of second branches are overlapped. The plurality of light valves are disposed between the backlight source and the plurality of pixel structures.

11 Claims, 14 Drawing Sheets

(56) References Cited

U.S. PATENT DOCUMENTS

| | | | |
|---|---|---|---|
| 2012/0092385 A1* | 4/2012 | Ikeno | G09G 3/3611 |
| | | | 345/690 |
| 2013/0235315 A1* | 9/2013 | Ito | G02F 1/133784 |
| | | | 349/126 |
| 2014/0028924 A1* | 1/2014 | Yamaguchi | G02F 1/29 |
| | | | 349/1 |
| 2016/0349574 A1 | 12/2016 | Iwashita et al. | |
| 2018/0052342 A1* | 2/2018 | Chang | G02F 1/1323 |
| 2018/0164622 A1* | 6/2018 | Ono | G02F 1/1395 |
| 2018/0210247 A1* | 7/2018 | Ono | G02F 1/136286 |
| 2018/0275483 A1* | 9/2018 | Nakanishi | G02F 1/1347 |
| 2019/0179204 A1* | 6/2019 | Bang | G02F 1/134309 |

* cited by examiner

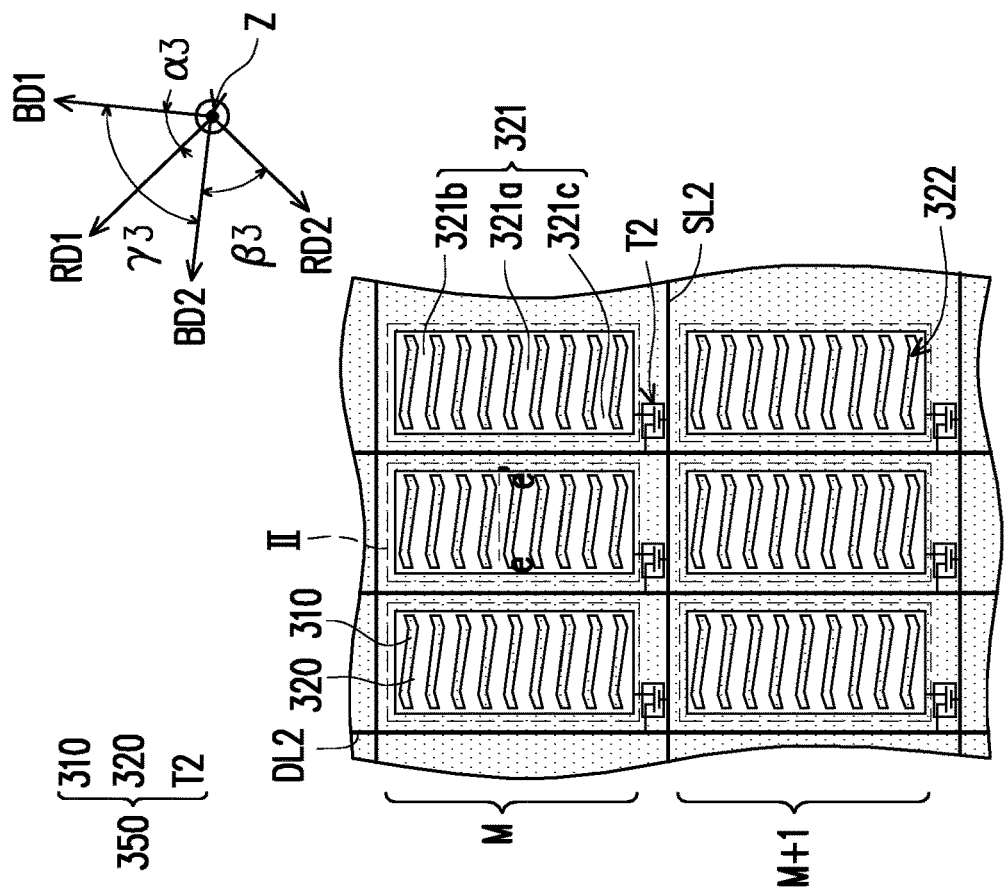
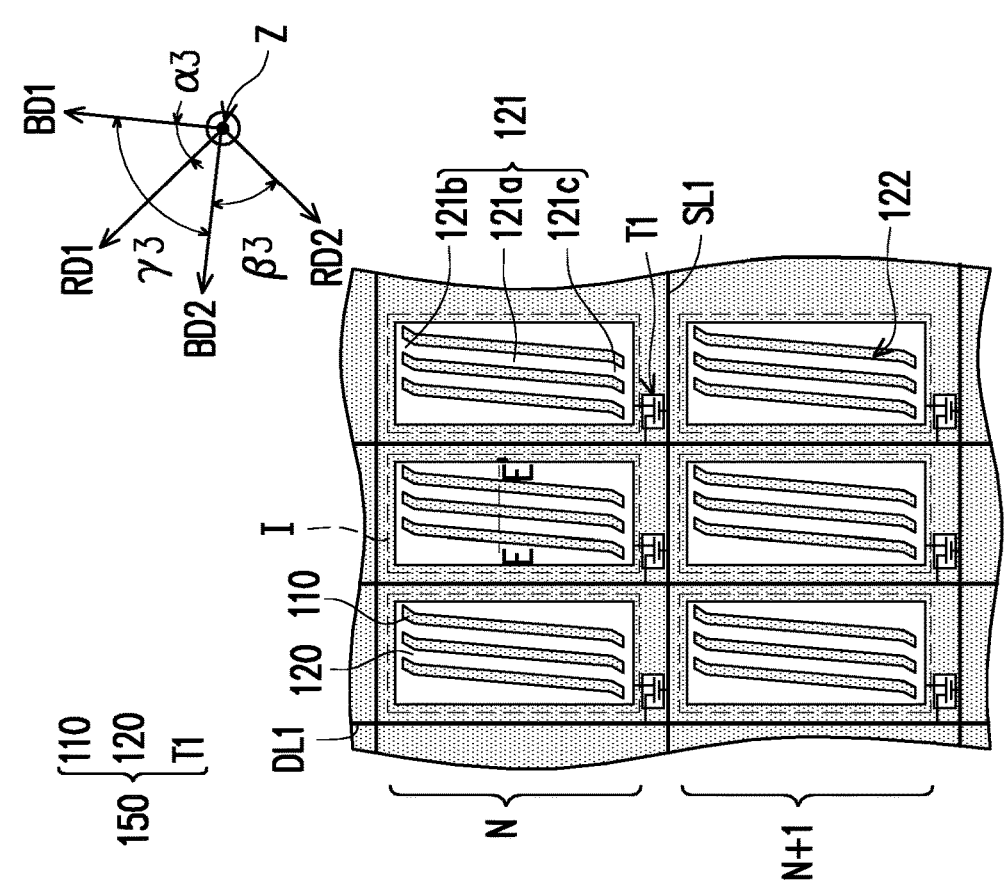
FIG. 15
FIG. 14

DISPLAY DEVICE

CROSS-REFERENCE TO RELATED APPLICATION

This application claims the priority benefit of Taiwan application serial no. 107111600, filed on Apr. 2, 2018. The entirety of the above-mentioned patent application is hereby incorporated by reference herein and made a part of this specification.

BACKGROUND

Field of the Disclosure

The disclosure is related to an electronic device, and particularly to a display device.

Description of Related Art

Liquid crystal display has the advantage of being compact with low power consumption and thus has replaced conventional cathode ray tube in the multi-media display field for the past twenty years, and even stands out as being developed beyond the level of many known display techniques in the market such as plasma display, field emission display and so on. Among known liquid crystal display techniques, liquid crystal driving technique may be classified into two types: one is vertical electrical field driving mode coordinated with negative-type liquid crystal molecules arranged in a manner of vertical alignment (VA), and the other one is horizontal electrical field driving mode coordinated with positive-type liquid crystal molecules arranged in a manner of planar alignment. The horizontal electrical field driving mode includes in-plane switching (IPS) mode and fringe field switching (FFS) mode derived from the former mode.

As compared with display panel in VA mode, the display panel in IPS mode and/or FFS mode has better display quality (i.e., with wider viewing angle) at a large viewing angle, but the performance related to dark-state and contrast of the display panel in IPS mode and/or FFS mode is inferior than that of the display panel in VA mode. In order to improve the contrast of display panel in IPS mode and/or FFS mode, a shutter panel having light-modulating function may be added between the display panel and a backlight source. However, when the alignment of the display panel in IPS mode and/or FFS mode and the shutter panel is slightly shifted, the optical property (e.g., viewing angle) of the display panel is significantly affected.

SUMMARY OF THE DISCLOSURE

The disclosure provides a display device having good properties.

According to an embodiment of the disclosure, a display device includes a first substrate, a second substrate, a plurality of first liquid crystal modules, a plurality of pixel structures, a third substrate, a fourth substrate, a plurality of second liquid crystal molecules, a plurality of light valves and a backlight source. The second substrate is disposed opposite to the first substrate, and the plurality of first liquid crystal molecules are disposed between the first substrate and the second substrate. The plurality of pixel structures are disposed on the first substrate, wherein each of the pixel structures includes a pixel electrode and a common electrode, at least one of the pixel electrode and the common electrode has a plurality of first branches, and the plurality of first branches are extended along a first extending direction. The fourth substrate is disposed opposite to the third substrate, and the plurality of second liquid crystal molecules are disposed between the third substrate and the fourth substrate. The plurality of first liquid crystal molecules and the plurality of second liquid crystal molecules are positive-type liquid crystal molecules, or the plurality of first liquid crystal molecules and the plurality of second liquid crystal molecules are negative-type liquid crystal molecules. The plurality of light valves corresponding to the plurality of pixel structures are disposed on the third substrate, wherein each of the light valves includes a first electrode and a second electrode, at least one of the first electrode and the second electrode has a plurality of second branches, and the plurality of second branches are extended along a second extending direction. The plurality of first branches and the plurality of second branches are at least partially overlapped, and the first extending direction and the second extending direction intersect each other. The plurality of light valves are disposed between the backlight source and the plurality of pixel structures.

According to an embodiment of the disclosure, a display device includes a first substrate, a second substrate, a plurality of first liquid crystal molecules, a plurality of pixel structures, a third substrate, a fourth substrate, a plurality of second liquid crystal molecules, a plurality of light valves and a backlight source. The second substrate is disposed opposite to the first substrate, and the plurality of first liquid crystal molecules are disposed between the first substrate and the second substrate. The plurality of pixel structures are disposed on the first substrate, wherein each of the pixel structures includes a pixel electrode and a common electrode, at least one of the pixel electrode and the common electrode has a plurality of first branches, and the plurality of first branches are extended along a first extending direction. The fourth substrate is disposed opposite to the third substrate, and the plurality of second liquid crystal molecules are disposed between the third substrate and the fourth substrate. One of the first liquid crystal molecule and the second liquid crystal molecule is positive-type liquid crystal molecule, and the other one is negative-type liquid crystal molecule. The plurality of light valves corresponding to the plurality of pixel structures are disposed on the third substrate, wherein each of the light valves includes a first electrode and a second electrode, at least one of the first electrode and the second electrode has a plurality of second branches. The plurality of second branches are extended along a second extending direction, the plurality of first branches and the plurality of second branches are at least partially overlapped, and the first extending direction and the second extending direction are parallel with each other. The plurality of light valves are disposed between the backlight source and the plurality of pixel structures.

According to an embodiment of the disclosure, the display device further includes a first alignment film and a second alignment film. The first alignment film covers a plurality of pixel structures and has a first rubbing direction. The second alignment film covers a plurality of light valves and has a second rubbing direction, wherein the first rubbing direction and the second rubbing direction are substantially parallel with each other. A plurality of first liquid crystal molecules and a plurality of second liquid crystal molecules are positive-type liquid crystal molecules. An included angle α1 is formed between the first rubbing direction and the first extending direction, and an included angle β1 is formed between the second rubbing direction and the second extending direction.

According to an embodiment of the disclosure, in the display device, an included angle $\gamma 1$ is formed between the first extending direction and the second extending direction, and the included angle $\gamma 1$ is equal to a sum of the included angle $\alpha 1$ and the included angle $\beta 1$.

According to an embodiment of the disclosure, the display device further includes a first alignment film and a second alignment film. The first alignment film covers a plurality of pixel structures and has a first rubbing direction. The second alignment film covers a plurality of light valves and has a second rubbing direction, wherein the first rubbing direction and the second rubbing direction are substantially perpendicular to each other. A plurality of first liquid crystal molecules and a plurality of second liquid crystal molecules are positive-type liquid crystal molecules. An included angle $\alpha 2$ is formed between the first rubbing direction and the first extending direction, and an included angle $\beta 2$ is formed between the second rubbing direction and the second extending direction.

According to an embodiment of the disclosure, the display device satisfies $\alpha 2<45°$, and $\beta 2<45°$.

According to an embodiment of the disclosure, in the display device, an included angle $\gamma 2$ is formed between the first extending direction and the second extending direction, and $\gamma 2=90°-\alpha 2+\beta 2$.

According to an embodiment of the disclosure, in the display device, an included angle $\gamma 2$ is formed between the first extending direction and the second extending direction, and $\gamma 2=90°-\beta 2+\alpha 2$.

According to an embodiment of the disclosure, the display device further includes a first alignment film and a second alignment film. The first alignment film covers a plurality of pixel structures and has a first rubbing direction. The second alignment film covers a plurality of light valves and has a second rubbing direction, wherein the first rubbing direction and the second rubbing direction are substantially perpendicular to each other. A plurality of first liquid crystal molecules and a plurality of second liquid crystal molecules are negative-type liquid crystal molecules. An included angle $\alpha 3$ is formed between the first rubbing direction and the first extending direction, and an included angle $\beta 3$ is formed between the second rubbing direction and the second extending direction.

According to an embodiment of the disclosure, the display device satisfies $45°\leq\alpha 3\leq 90°$, and $45°\leq\beta 3\leq 90°$.

According to an embodiment of the disclosure, in the display device, an included angle $\gamma 3$ is formed between the first extending direction and the second extending direction, and $\gamma 3=90°-\beta 3+\alpha 3$.

According to an embodiment of the disclosure, in the display device, an included angle $\gamma 3$ is formed between the first extending direction and the second extending direction, and $\gamma 3=90°-\alpha 3+\beta 3$.

According to an embodiment of the disclosure, in the display device, each of the first branches has a first straight line portion extended along the first extending direction, each of the second branches has a second straight line portion extended along the second extending direction, and an included angle $\gamma$ is formed between the first extending direction and the second extending direction, and $\gamma\geq 20°$.

According to an embodiment of the disclosure, in the display device, each of the first branches has a first straight line portion extended along the first extending direction, a ratio of the area of the first straight line portion to the area of each of the first branches is larger than 80%. Each of the second branches has a second straight line portion extended along the second extending direction, and a ratio of the area of the second straight line portion to the area of each of the second branches is larger than 80%.

According to an embodiment of the disclosure, in the display device, the plurality of pixel structures are arranged as a plurality of rows. The plurality of first branches of each of the pixel structures corresponding to Nth row are parallel with a plurality of first branches of each of the pixel structures corresponding to N+1th row. The plurality of light valves are arranged as a plurality of rows. The plurality of second branches of each of the light valves corresponding to Mth row are parallel with the plurality of second branches of each of the light valves corresponding to M+1th row. N and M are positive integers.

According to an embodiment of the discourse, the display device further includes a first alignment film and a second alignment film. The first alignment film covers a plurality of pixel structures and has a first rubbing direction, and the second alignment film covers a plurality of light valves and has a second rubbing direction, wherein the first rubbing direction and the second rubbing direction are substantially perpendicular to each other, and an included angle $\alpha 4$ is formed between the first rubbing direction and the first extending direction.

According to an embodiment of the disclosure, in the display device, the plurality of first liquid crystal molecules are positive-type liquid crystal molecules, the plurality of second liquid crystal molecules are negative-type liquid crystal molecules, and an included angle $\beta 4$ is formed between the second rubbing direction and the second extending direction, and $\beta 4=90°+\alpha 4$.

According to an embodiment of the disclosure, in the display device, the plurality of first liquid crystal molecules are negative-type liquid crystal molecules, the plurality of second liquid crystal molecules are positive-type liquid crystal molecules, and an included angle $\beta 4$ is formed between the second rubbing direction and the second extending direction, and $\alpha 4=90°+\beta 4$.

An embodiment of the disclosure, in the display device, each of the first branches has a first straight line portion extended along the first extending direction, a ratio of the area of the first straight line portion to the area of each of the first branches is larger than 80%. Each of the second branches has a second straight line portion extended along a second extending direction, and a ratio of the area of the second straight line portion to the area of each of the second branches is larger than 80%.

According to an embodiment of the disclosure, in the display device, the plurality of pixel structures are arranged as a plurality of rows. The plurality of first branches of each of the pixel structures corresponding to Nth row are parallel with the plurality of first branches of each of the pixel structures corresponding to N+1th row. The plurality of light valves are arranged as a plurality of rows. The plurality of second branches of each of the light valves corresponding to Mth row are parallel with the plurality of second branches of each of the light valves corresponding to M+1th row.

Based on the above, in the display device according to the embodiments of the disclosure, the pixel electrode of each of the pixel structures of the display panel has the plurality of first branches, the second electrode of each of the light valves of the shutter panel has the plurality of second branches. The plurality of first liquid crystal molecules in a sub-pixel region of the display panel constitute one first domain. The plurality of second liquid crystal molecules in each of sub-light-modulating region of the shutter panel constitute one second domain. Since the first extending direction of the display panel and the second extending direction of the shutter panel intersect each other, the one first domain in the sub-pixel region of the display panel and the one corresponding second domain in the sub-light-modulating region of the shutter panel have different optical properties. The first domain and the second domain having different optical properties are overlapped and form one multi-domain, such that the display device formed of the display panel and the shutter panel stacked onto each other has wide viewing angle property.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 14 is a top view of a pixel structure according to the fifth embodiment of the disclosure.

FIG. 15 is a top view of a light valve according to the fifth embodiment of the disclosure.

DESCRIPTION OF EMBODIMENTS

Figure 1:
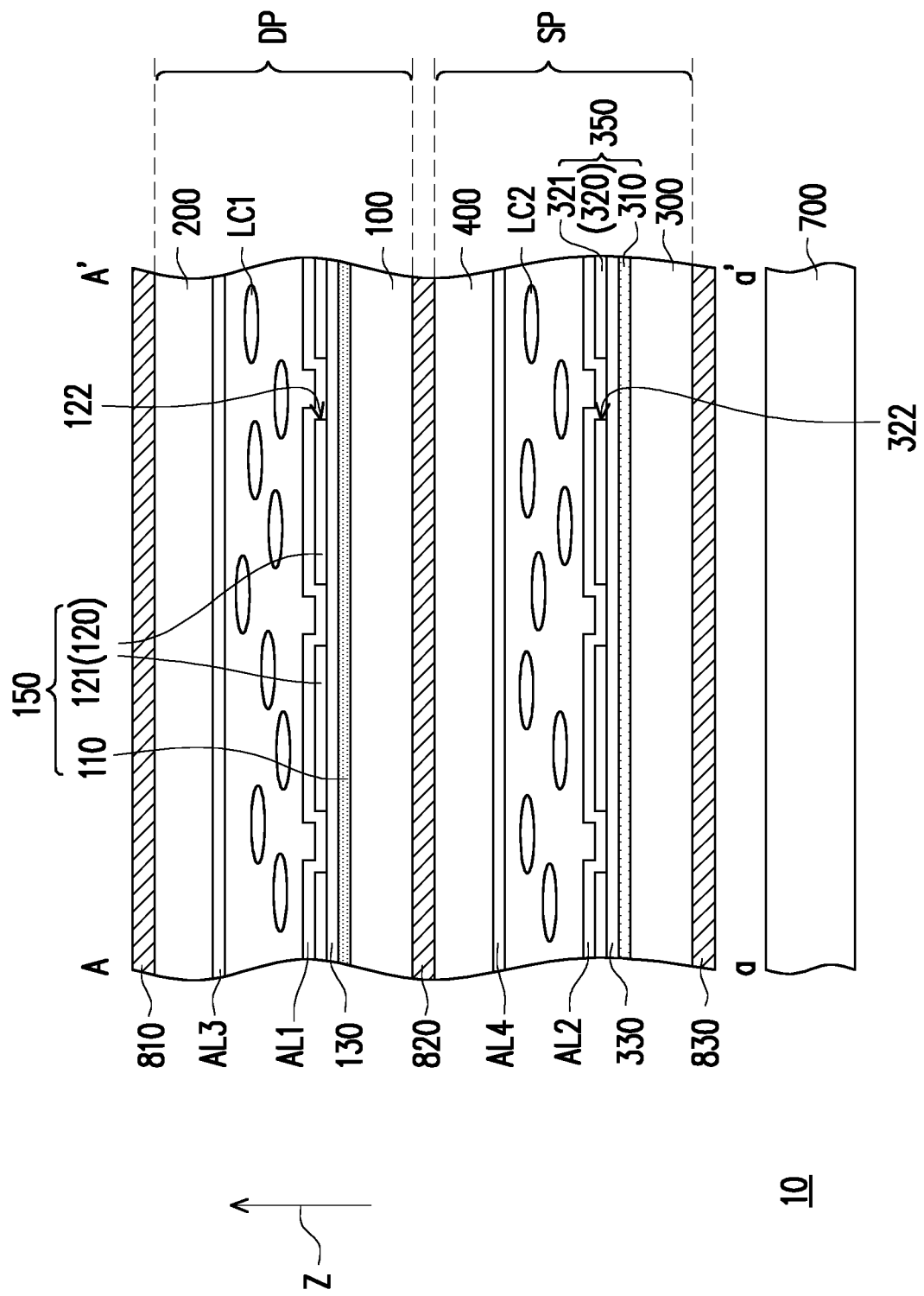
FIG. 1 is a cross-sectional view of a display device according to a first embodiment of the disclosure.

In the drawings, in order show the illustrations clearly, the thickness of layers, films, panels and regions are exaggerated. Throughout the specification, the same reference numeral denotes the same element. It should be understood that when it is described that an element on the layer, film, region or substrate is "on" another element or "connected to" another element, it can be either directly on another element or connected to another element; alternatively, an intervening element may be present. On the contrary, when it is described that an element is "directly on another element" or "directly connected to" another element, no intervening element is present there. As described in the present text, "connected to" or "coupled to" may refer to physical and/or electrical connection. Alternatively, "electrically connected" or "coupled to" may refer to that there is another element existed between two elements.

Unless defined otherwise, all technical and scientific terms used herein have the same meaning as commonly understood by one of ordinary skill in the art to which this disclosure belongs. It is noted that the use of any and all examples, or exemplary terms provided herein is intended merely to better illuminate the disclosure and is not a limitation on the scope of the disclosure unless otherwise specified. Further, unless defined otherwise, all terms defined in generally used dictionaries may not be overly interpreted.

The terminology used herein is for the purpose of describing particular embodiments and is not intended to be limiting of the disclosure. As used herein, the singular forms "a," "an" and "the" are intended to include the plural forms as well, including "at least one", unless the context clearly indicates otherwise.

The exemplary embodiment is described below with reference of a cross-sectional view of a schematic diagram of an idealized embodiment. Therefore, a shape change of the figure serving as a result of manufacturing techniques and/or tolerances may be expected. Therefore, the embodiment of the disclosure should not be construed as limited to a particular shape of a region as shown herein, but includes a shape deviation caused by manufacturing tolerance. For example, a shown or described flat area may generally have rough and/or non-linear features. Moreover, a shown acute angle may be round. Therefore, a region shown in the figure is essentially schematic, and a shape thereof is not intended to show an accurate shape of the region, and is not intended to limit a range of the claims of the disclosure.

Descriptions of the invention are given with reference to the exemplary embodiments illustrated by the accompanying drawings. Wherever possible, the same reference numerals are used in the drawings and the descriptions to refer to the same or similar parts.

Figure 3:
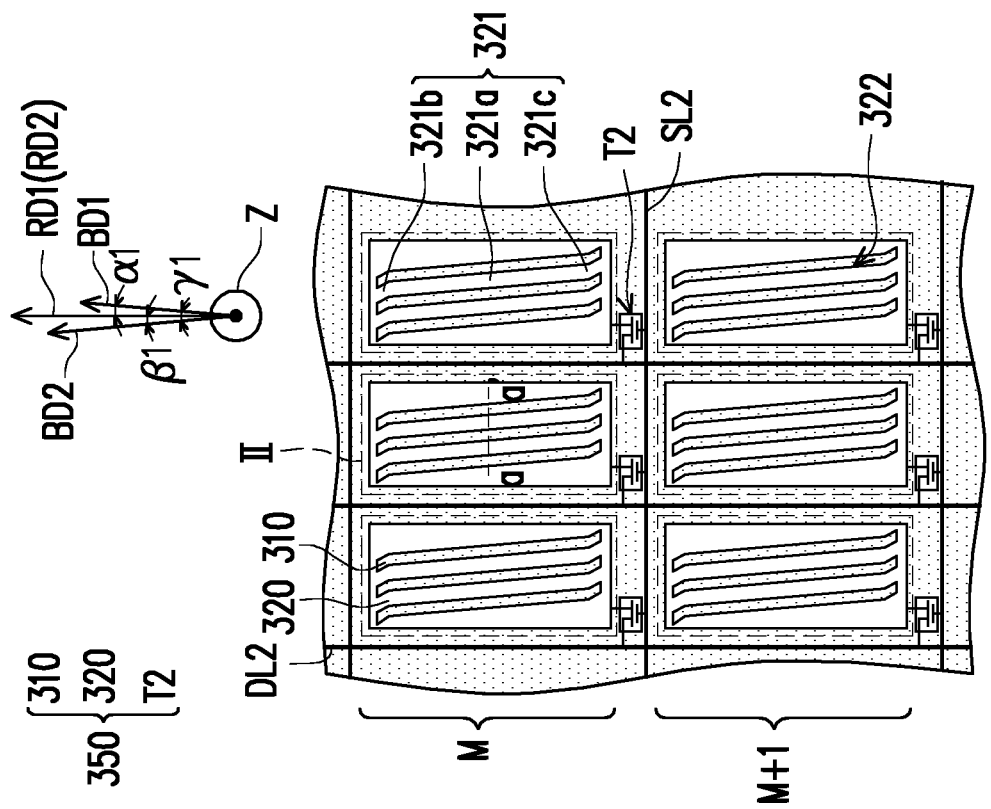
FIG. 3 is a top view of a light valve according to the first embodiment of the disclosure.
Figure 2:
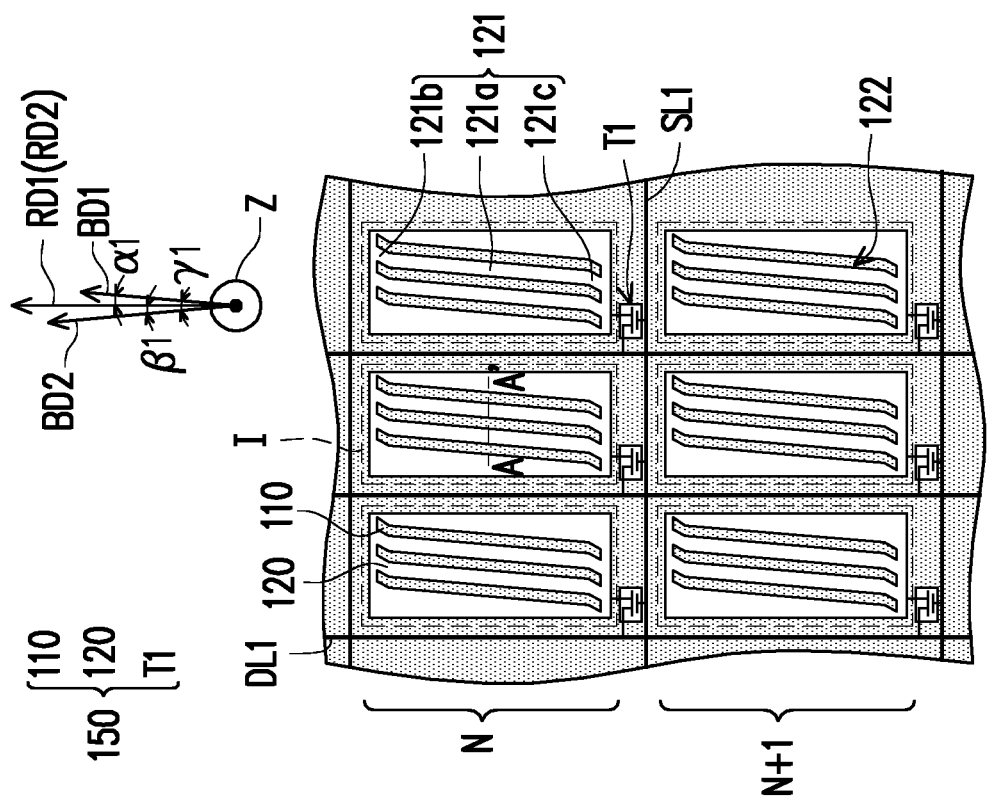
FIG. 2 is a top view of a pixel structure according to a first embodiment of the disclosure.

FIG. 1 is a cross-sectional view of a display device 10 according to a first embodiment of the disclosure. FIG. 2 is a top view of a pixel structure 150 according to the first embodiment of the disclosure. FIG. 3 is a top view of a light valve 350 according to the first embodiment of the disclosure. Specifically, FIG. 1 corresponds to line A-A' taken along FIG. 2 and line a-a' taken along FIG. 3.

Referring to FIG. 1, in the embodiment, the display device 10 includes a display panel DP, a shutter panel SP and a backlight source 700. The shutter panel SP is disposed between the backlight source 700 and the display panel DP. In the embodiment, the brightness in different regions of the display panel DP may be different so as to improve contrast of the display device 10 by adjusting the light transmittances of different regions of the shutter panel SP according to the pre-determined brightness of each region of the display image. For example, the display image of the display panel DP includes a dark region and a bright region. The light transmittance in the region of the shutter panel SP under the dark region of the display image may be adjusted to be close to 0%, such that the light beam emitted by the backlight source 700 does not easily pass through the dark region of the display image of the display panel DP. The light transmittance in the region of the shutter panel SP under the bright region of the display image may be adjusted to be close to 100%, such that most part of the light beam emitted by the backlight source 700 can pass through the bright region of the display image of the display panel DP. In this manner, the brightness in the dark region of the display image may be reduced, and the bright region of the display image can still have a certain degree of brightness, thereby improving the contrast of display device 10.

Referring to FIG. 1 and FIG. 2, the display panel DP includes a first substrate 100, a second substrate 200, a plurality of first liquid crystal molecules LC1 and a plurality of pixel structures 150. The second substrate 200 is disposed opposite to the first substrate 100. The plurality of first liquid crystal molecules LC1 are disposed between the first substrate 100 and the second substrate 200. In the embodiment, the plurality of pixel structures 150 may be disposed on the first substrate 100, which should not be construed as a limitation to the disclosure. Each of the pixel structures 150 includes a pixel electrode 120 and a common electrode 110. In the present embodiment, each of the pixel structures 150 further includes a thin film transistor T1 (shown in FIG. 2) electrically connected to the pixel electrode 120. The thin film transistor T1 of each of the pixel structures 150 is electrically connected to a corresponding scan line SL1 (shown in FIG. 2) and a corresponding data line DL1 (shown in FIG. 2).

Additionally, in the embodiment, the display panel DP may further selectively include an insulating layer 130 (shown in FIG. 1). The insulating layer 130 is disposed between the pixel electrode 120 and the common electrode 110. One of the pixel electrode 120 and the common electrode 110 (e.g., pixel electrode 120) has a plurality of first branches 121. The plurality of first branches 121 define a plurality of slits 122, the other one of the pixel electrode 120 and the common electrode 110 (e.g., common electrode 110) is overlapped with the plurality of slits 122. In other words, in the embodiment, the display panel DP may be a fringe field switching (FFS) mode selectively, which should not be construed as a limitation to the disclosure. In other embodiments, the display panel DP may be an in-plane switching (IPS) mode or other suitable mode.

Referring to FIG. 1, in the embodiment, the display panel DP further includes a first alignment film AL1. The first alignment film AL1 is disposed on the first substrate 100 and covers the plurality of pixel structures 150. In the embodiment, the display panel DP further includes a third alignment film AL3. The third alignment film AL3 is disposed on the second substrate 200. The plurality of first liquid crystal molecules LC1 are disposed between the first alignment film AL1 and the third alignment film AL3. In the embodiment, the material of the first alignment film AL1 and the material of the third alignment film AL3 include polyimide, organic material having photoreactive group or other material suitable for liquid crystal alignment, which should not be construed as a limitation to the disclosure.

Referring to FIG. 1 and FIG. 3, the shutter panel SP includes a third substrate 300, a fourth substrate 400, a plurality of second liquid crystal molecules LC2 and a plurality of light valves 350. The fourth substrate 400 is disposed opposite to the third substrate 300. The plurality of second liquid crystal molecules LC2 are disposed between the third substrate 300 and the fourth substrate 400. The plurality of light valves 350 are disposed between the backlight source 700 and the plurality of pixel structures 150. The plurality of light valves 350 are disposed corresponding to the plurality of pixel structures 150. In the embodiment, the plurality of light valves 350 may be disposed on the third substrate 300, which should not be construed as a limitation to the disclosure. Each of the light valves 350 includes a first electrode 310 and a second electrode 320. In the embodiment, each of the light valves 350 further includes a thin film transistor T2 (shown in FIG. 3) electrically connected to the second electrode 320. The thin film transistor T2 of each of the light valves 350 is electrically connected to a corresponding scan line SL2 (shown in FIG. 3) and a corresponding data line DL2 (shown in FIG. 3).

Additionally, in the embodiment, the shutter panel SP may further selectively include an insulating layer 330 (shown in FIG. 1). The insulating layer 330 is disposed between the first electrode 310 and the second electrode 320. One of the first electrode 310 and the second electrode 320 (e.g., second electrode 320) has a plurality of second branches 321. The plurality of second branches 321 define a plurality of slits 322. The other one of the first electrode 310 and the second electrode 320 (e.g., first electrode 310) is overlapped with the plurality of slits 322. That is to say, in the embodiment, the shutter panel SP may be a fringe field switching (FFS) mode selectively, which should not be construed as a limitation to the disclosure. In other embodiments, the shutter panel SP may be an in-plane switching (IPS) mode or other suitable mode.

In the embodiment, the shutter panel SP further includes a second alignment film AL2. The second alignment film AL2 is disposed on the third substrate 300 and covers the plurality of light valves 350. In the embodiment, the shutter panel SP further includes a fourth alignment film AL4. The fourth alignment film AL4 is disposed on the fourth substrate 400. The plurality of second liquid crystal molecules LC2 are disposed between the second alignment film AL2 and the fourth alignment film AL4. In the embodiment, the material of the second alignment film AL2 and the material of the fourth alignment film AL4 include polyimide, an organic material having photoreactive group or other material suitable for liquid crystal alignment, which should not be construed as a limitation to the disclosure.

For example, in the embodiment, the pixel electrode 120, the common electrode 110, the first electrode 310 and the second electrode 320 may be transparent electrodes. The material of the transparent electrodes includes indium-tin-oxide, indium-zinc-oxide, aluminum-tin-oxide, aluminum-zinc-oxide, indium-germanium-zinc-oxide, other suitable oxide, or a stacked layer of at least two of the above, which should not be construed as a limitation to the disclosure. Additionally, in the embodiment, the plurality of first liquid crystal molecules LC1 and the plurality of second liquid crystal molecules LC2 may be positive-type liquid crystal molecules, which should not be construed as a limitation to the disclosure.

Referring to FIG. 1, in the embodiment, the display device 10 further includes a plurality of polarizers 810, 820, 830. The polarizer 810 is disposed on the second substrate 200 of the display panel DP. The polarizer 820 is disposed between the display panel DP and the shutter panel SP. The polarizer 830 is disposed between the shutter panel SP and the backlight source 700.

Referring to FIG. 1, FIG. 2 and FIG. 3, in the embodiment, the pixel electrode 120 of each of the pixel structures 150 has the plurality of first branches 121. The plurality of first branches 121 are extended along a first extending direction BD1. The second electrode 320 of each of the light valves 350 has the plurality of second branches 321. The plurality of second branches 321 are extended along a second extending direction BD2. The first extending direction BD1 and the second extending direction BD2 intersect each other. The plurality of first branches 121 of each of the pixel structures 150 are partially overlapped with the plurality of corresponding second branches 321 of one light valve 350.

Referring to FIG. 1 and FIG. 2, in the embodiment, each of the first branches 121 has a first straight line portion 121a, an oblique line portion 121b and an oblique line portion 121c. The oblique line portion 121b and the oblique line portion 121c are respectively disposed on both sides of the first straight line portion 121a and respectively connected to both ends of the first straight line portion 121a. The ratio of the area of each of the first straight line portions 121a to the area of each of the first branches 121 (i.e., sum of area of first straight line portion 121a, area of oblique line portion 121b and area of oblique line portion 121c) is larger than 80%. In other words, an aperture of a light-shielding pattern (e.g., black matrix, not shown) of the display panel DP defines a sub-pixel region I (shown in FIG. 2). The pixel electrode 120 of each of the pixel structures 150 and the common electrode 110 are disposed in a corresponding sub-pixel region I. All of the first liquid crystal molecules LC1 in each of the sub-pixel regions I are substantially arranged along the same direction, and each of the sub-pixel regions I has one first domain. In the embodiment, the first straight line portion 121a is extended along the first extending direction BD1, and the first extending direction BD1 is the extending direction of the first straight line portion 121a.

Referring to FIG. 2, in the embodiment, the plurality of pixel structures 150 are arranged as a plurality of rows on the first substrate 100, wherein the plurality of first branches 121 of each of the pixel structures 150 corresponding to Nth row are parallel with the plurality of first branches 121 of each of the pixel structures 150 corresponding to N+1th row, and N is a positive integer. That is to say, in the embodiment, the plurality of first domains of all the sub-pixel regions I of the display panel DP have substantially identical optical properties.

Referring to FIG. 1 and FIG. 3, in the embodiment, each of the second branches 321 has a second straight line portion 321a, an oblique line portion 321b and an oblique line portion 321c. The oblique line portion 321b and the oblique line portion 321c are respectively disposed on both sides of the second straight line portion 321a and respectively connected to both ends of the second straight line portion 321a. The ratio of the area of each of the second straight line portions 321a to the area of each of the second branches 321 (i.e., sum of area of second straight line portion 321a, area of oblique line portion 321b and area of oblique line portion 321c) is larger than 80%. In other words, an aperture of a light-shielding pattern (e.g., black matrix, not shown) of the shutter panel SP defines a sub-light-modulating region II. The first electrode 310 and the second electrode 320 of each of the light valves 350 are disposed in a corresponding sub-light-modulating region II. The plurality of second liquid crystal molecules LC2 in each of the sub-light-modulating regions II are substantially arranged along the same direction, and each of the sub-light-modulating regions II has one second domain. In the embodiment, the second straight line portion 321a is extended along the second extending direction BD2, and the second extending direction BD2 is the extending direction of the second straight line portion 321a.

In the embodiment, the plurality of light valves 350 are arranged as a plurality of rows on the third substrate 300, wherein the plurality of second branches 321 of each of the light valves 350 corresponding to Mth row are parallel with the plurality of second branches 321 of each of the light valves 350 corresponding to M+1th row, and M is a positive integer. That is to say, in the embodiment, all of the second domains in all the sub-light-modulating regions II of the shutter panel SP have substantially identical optical properties.

Referring to FIG. 2 and FIG. 3, in the embodiment, for example, each of the pixel structures 150 corresponding to the Nth row is aligned and overlapped with each of the light valves 350 corresponding to the Mth row. For example, the plurality of pixel structures 150 in the Nth row in direction Z are respectively and completely overlapped with the plurality of light valves 350 corresponding to the Mth row. The plurality of sub-pixel regions I in the Nth row in direction Z are respectively and completely overlapped with the plurality of sub-light-modulating regions II corresponding to the Mth row. For example, each of the pixel structures 150 corresponding to N+1th row is aligned and overlapped with each of the light valves 350 corresponding to M+1th row. For example, the plurality of pixel structures 150 in the N+1 row in direction Z are respectively and completely overlapped with the plurality of light valves 350 corresponding to the M+1th row, the plurality of sub-pixel regions I in the N+1th row in direction Z are respectively and completely overlapped with the plurality of sub-light-modulating regions II corresponding to the M+1 row. The pixel structure 150 in the N+1th row is subsequent to the pixel structure 150 in the Nth row, and the light valve 350 in the M+1th row is subsequent to the light valve 350 in the Mth row.

Referring to FIG. 2 and FIG. 3, in the embodiment, an included angle $\gamma 1$ is formed between the first extending direction BD1 and the second extending direction BD2. For example, the included angle $\gamma 1$ satisfies the equation below: $90° > \gamma 1 \geq 20°$, which should not be construed as a limitation to the disclosure. Referring to FIG. 1 and FIG. 2, the first alignment film AL1 has a first rubbing direction RD1. Referring to FIG. 1 and FIG. 3, the second alignment film AL2 has a second rubbing direction RD2. Referring to FIG. 2 and FIG. 3, in the embodiment, the first rubbing direction RD1 and the second rubbing direction RD2 are substantially parallel with each other. In the embodiment, the third alignment film AL3 (shown in FIG. 1) may have a third rubbing direction opposite to the first rubbing direction RD1, and the fourth alignment film AL4 (shown in FIG. 1) may have a fourth rubbing direction opposite to the second rubbing direction RD2, which should not be construed as a limitation to the disclosure.

In the embodiment, an included angle $\alpha 1$ is formed between the first rubbing direction RD1 of the first alignment film AL1 and the first extending direction BD1 of each of the pixel structures 150, and an included angle $\beta 1$ is formed between the second rubbing direction RD2 of the second alignment film AL2 and the second extending direction BD2 of each of the light valves 350. An included angle $\gamma 1$ is formed between the first extending direction BD1 and the second extending direction BD2, and the included angle $\gamma 1$ is equal to the sum of the included angle $\alpha 1$ and the included angle $\beta 1$. In the embodiment, the included angle $\alpha 1$ between the first rubbing direction RD1 and the first extending direction BD1 may be equal to the included angle $\beta 1$ between the second rubbing direction RD2 and the second extending direction BD2, which should not be construed as a limitation to the disclosure.

It should be indicated that, in the embodiment, the plurality of first liquid crystal molecules LC1 in one sub-pixel region I of the display panel DP constitute one first domain, and the at least one sub-light-modulating region II of the shutter panel SP corresponds to the sub-pixel region I of the display panel DP. The plurality of second liquid crystal molecules LC2 in each of the sub-light-modulating regions II constitute one second domain. Since the first extending direction BD1 of the display panel DP and the second extending direction BD2 of the shutter panel SP intersect each other, the one first domain in the sub-pixel region I of the display panel DP and the one corresponding second domain of the sub-light-modulating region II of the shutter panel SP have different optical properties. The first domain and the second domain having different optical properties are overlapped in the direction Z and form a multi-domain, such that the display device 10 formed of the display panel DP and shutter panel SP stacked onto each other has the wide viewing angle property. Additionally, in the embodiment, each of the sub-pixel regions I of the display panel DP has one domain, and the domains of all of the sub-pixel regions I of the display panel DP have the same optical properties. Each of the sub-light-modulating regions II of the shutter panel SP also has one domain, and the domains of all of the sub-light-modulating regions II of the shutter panel SP have the same optical properties. In this manner, even if the display panel DP and the shutter panel SP are not aligned with each other, the display device 10 still has good wide viewing angle property.

Figure 4:
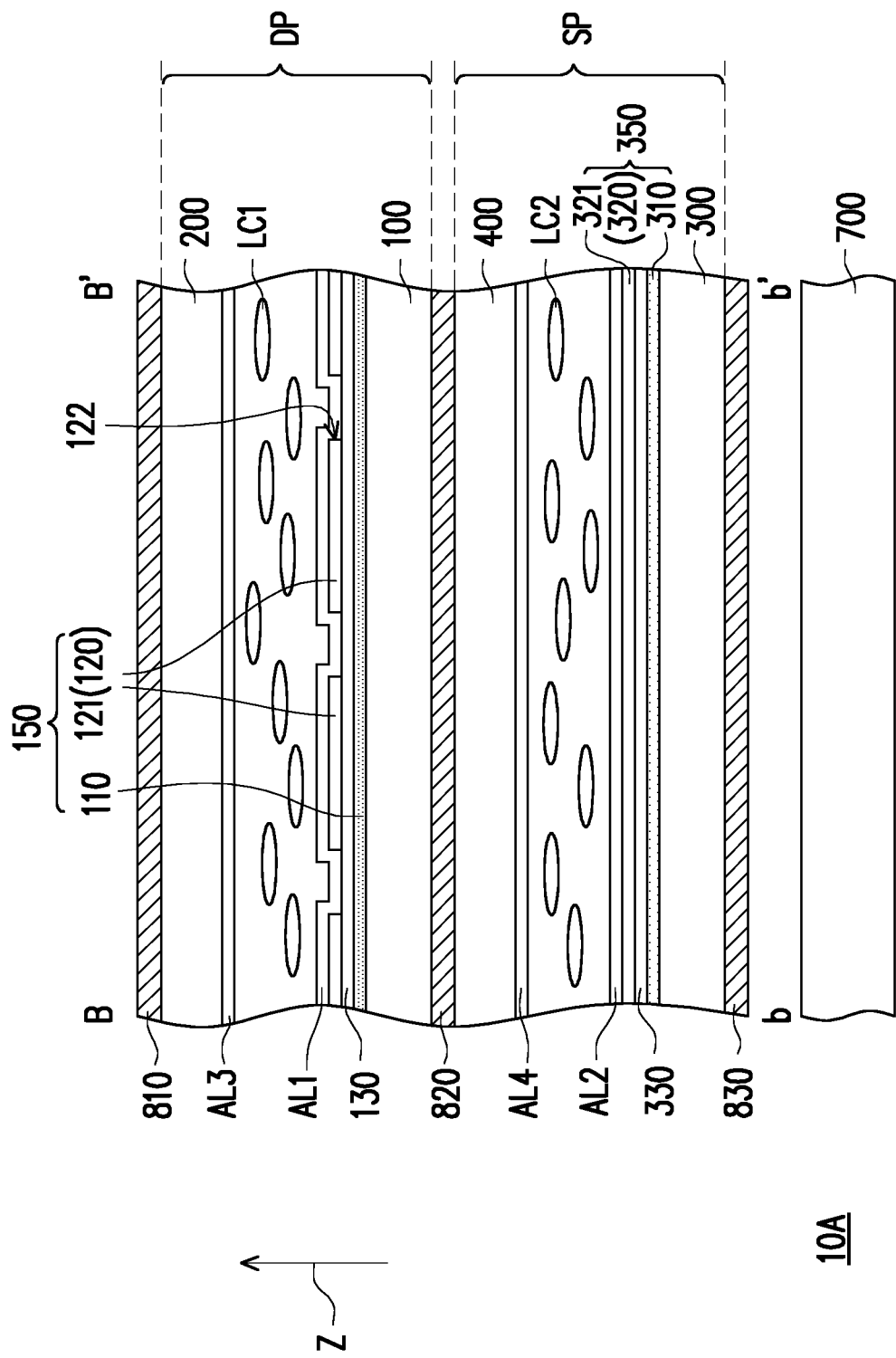
FIG. 4 is a cross-sectional view of a display device according to a second embodiment of the disclosure.
Figure 6:
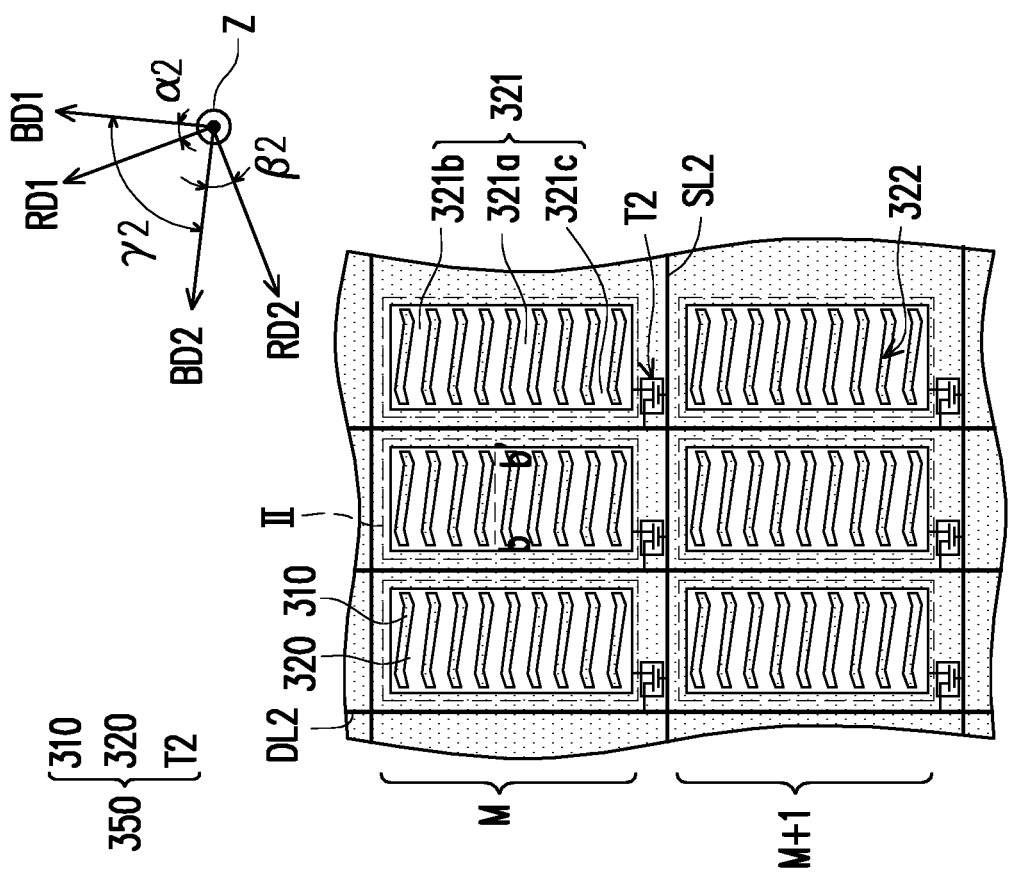
FIG. 6 is a top view of a light valve according to the second embodiment of the disclosure.
Figure 5:
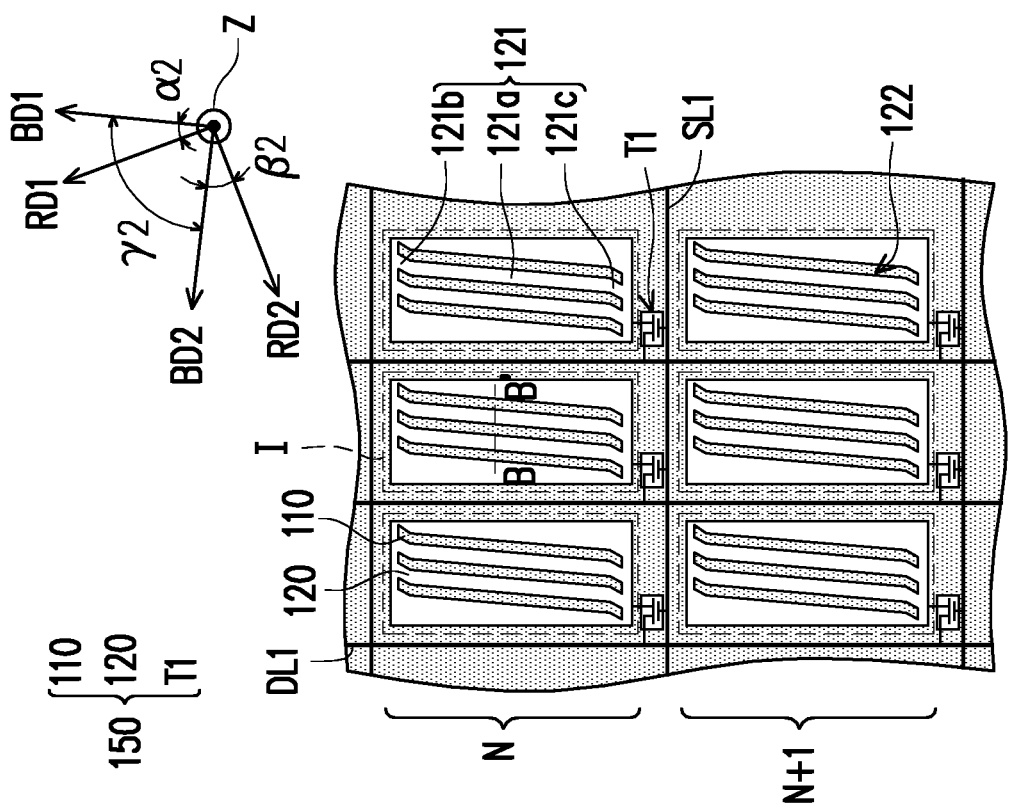
FIG. 5 is a top view of a pixel structure according to the second embodiment of the disclosure.

FIG. 4 is a cross-sectional view of a display device 10A according to a second embodiment of the disclosure. FIG. 5 is a top view of a pixel structure 150 according to the second embodiment of the disclosure. FIG. 6 is a top view of a light valve 350 according to the second embodiment of the disclosure. Specifically, FIG. 4 corresponds to line B-B' taken along FIG. 5 and line b-b' taken along FIG. 6.

Referring to FIG. 4, FIG. 5 and FIG. 6, first liquid crystal molecules LC1 and second liquid crystal molecules LC2 of the display device 10A in the embodiment are positive-type liquid crystal molecules. The difference between the display device 10A in the embodiment and the display device 10 in the first embodiment is that the first rubbing direction RD1 of the first alignment film AL1 of the display device 10A in the embodiment is substantially perpendicular to the second rubbing direction RD2 of the second alignment film AL2, and the first extending direction BD1 of each of the pixel structures 150 is substantially perpendicular to the second extending direction BD2 of each of the light valves 350.

Referring to FIG. 5 and FIG. 6, in the embodiment, an included angle $\alpha 2$ is formed between the first rubbing direction RD1 and the first extending direction BD1, and an included angle $\beta 2$ is formed between the second rubbing direction RD2 and the second extending direction BD2. In the embodiment, the first extending direction BD1 rotated by an angle (i.e., included angle $\alpha 2$) in counter-clock wise direction is overlapped with the first rubbing directing RD1, and the second extending direction BD2 rotated by an angle (i.e., included angle $\beta 2$) in counter-clock wise direction is overlapped with the second rubbing direction RD2. In the embodiment, the included angle $\alpha 2$ satisfies the equation below: $\alpha 2<45°$, and the included angle $\beta 2$ satisfies the equation below: $\beta 2<45°$, which should not be construed as a limitation to the disclosure.

In the embodiment, an included angle $\gamma 2$ is formed between the first extending direction BD1 and the second extending direction BD2, and the included angle $\gamma 2$ satisfies the equation below: $\gamma 2=90°-\beta 2+\alpha 2$, which should not be construed as a limitation to the disclosure. In the embodiment, the included angle $\alpha 2$ between the first rubbing direction RD1 and the first extending direction BD1 may be equal to the included angle $\beta 2$ between the second rubbing direction RD2 and the second extending direction BD2, which should not be construed as a limitation to the disclosure. In the embodiment, the display device 10A has effects and advantages similar to that of the display device 10 in the first embodiment, and thus no repetition is incorporated herein.

Figure 7:
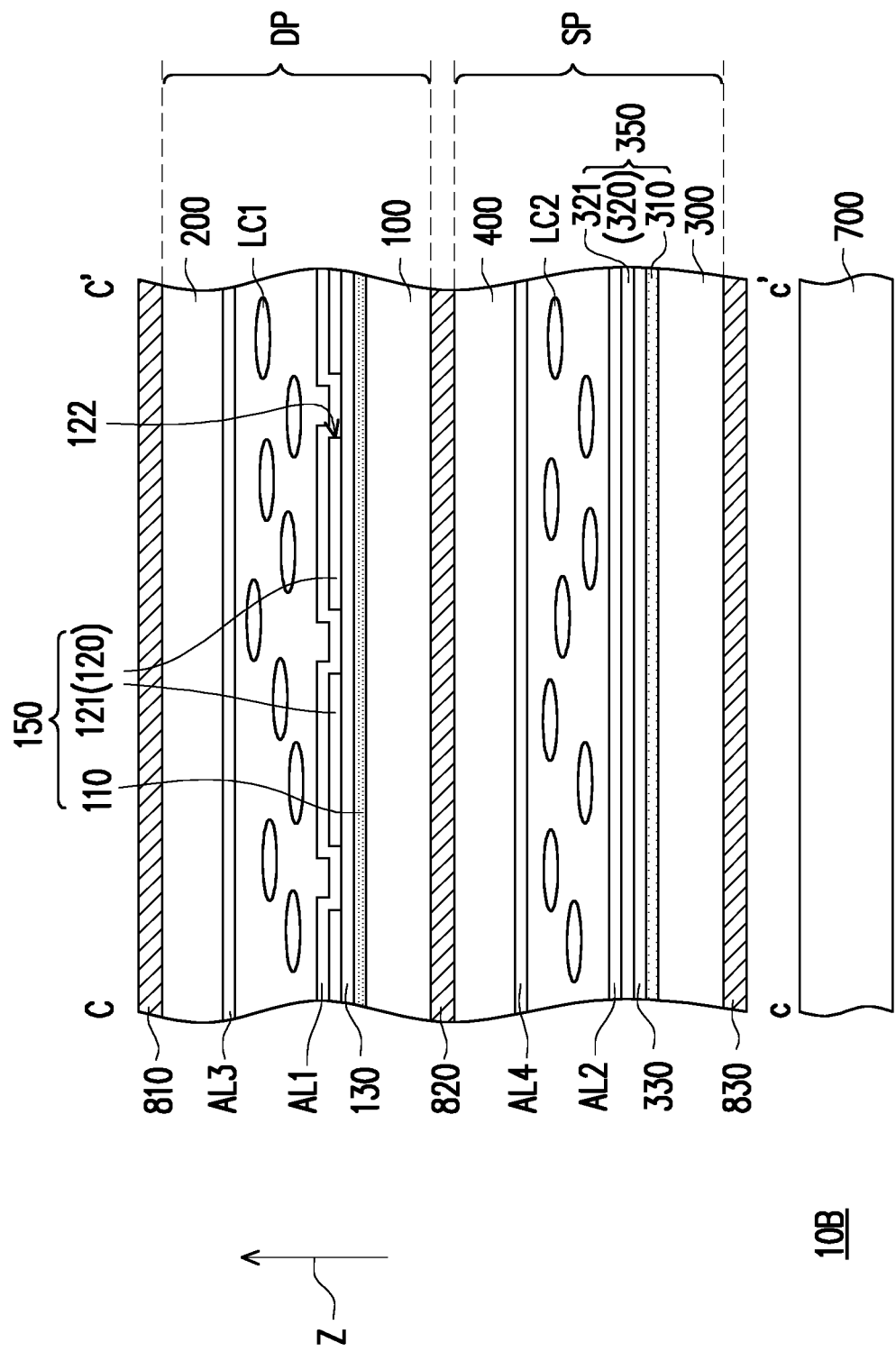
FIG. 7 is a cross-sectional view of a display device according to a third embodiment of the disclosure.
Figure 9:
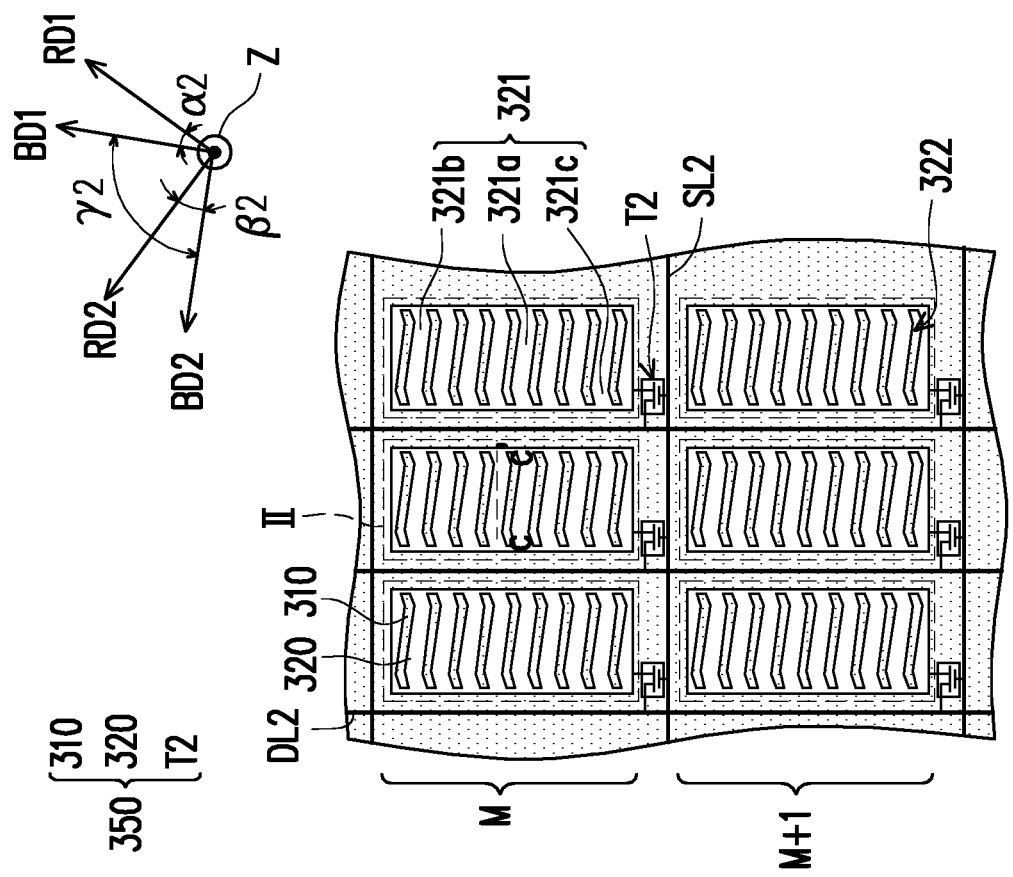
FIG. 9 is a top view of a light valve according to the third embodiment of the disclosure.
Figure 8:
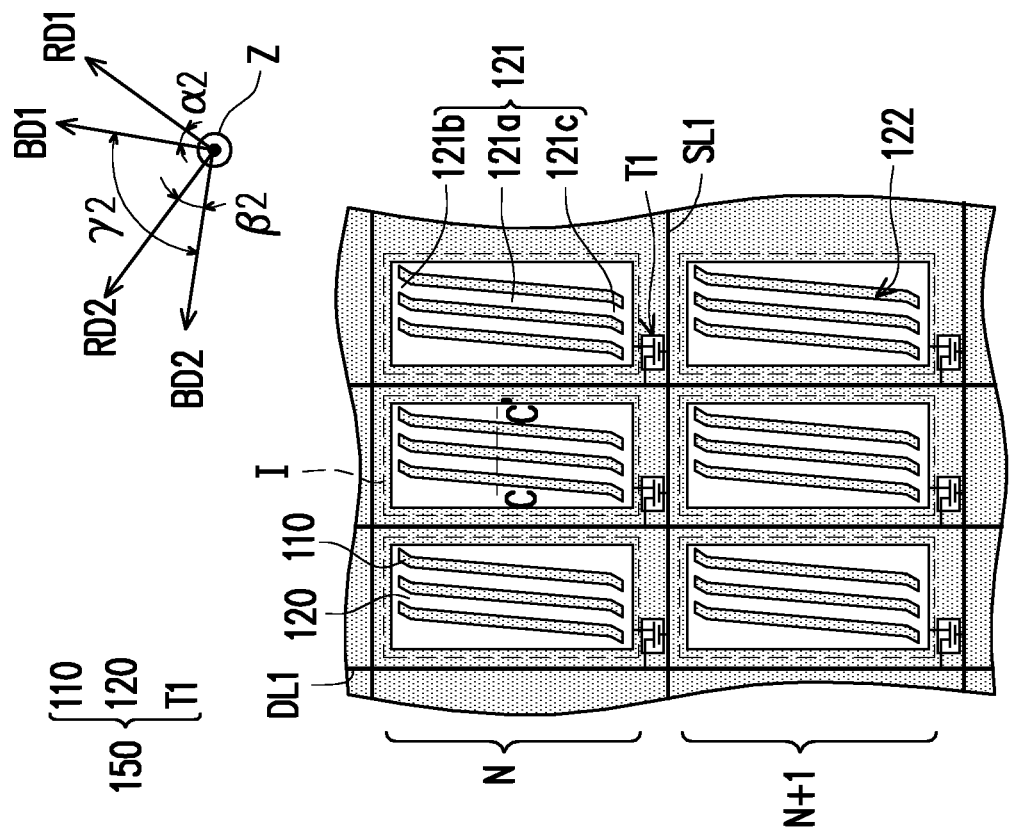
FIG. 8 is a top view of a pixel structure according to the third embodiment of the disclosure.

FIG. 7 is a cross-sectional view of a display device 10B according to a third embodiment of the disclosure. FIG. 8 is a top view of a pixel structure 150 according to the third embodiment of the disclosure. FIG. 9 is a top view of a light valve 350 according to the third embodiment of the disclosure. Specifically, FIG. 7 corresponds to line C-C' taken along FIG. 8 and line c-c' taken along FIG. 9.

Referring to FIG. 7, FIG. 8 and FIG. 9, the only difference between the display device 10B in the embodiment and the display device 10A in the second embodiment is that in the display device 10B of the embodiment, the first extending direction BD1 rotated by an angle (i.e., included angle $\alpha 2$) in clockwise direction is overlapped with the first rubbing direction RD1, and the second extending direction BD2 rotated by an angle (i.e., included angle $\beta 2$) in clockwise direction is overlapped with the second rubbing direction RD2. In the embodiment, an included angle $\gamma 2$ between the first extending direction BD1 and the second extending direction BD2 satisfies the equation below: $\gamma 2=90°-\alpha 2+\beta 2$, which should not be construed as a limitation to the disclosure. In the embodiment, the display device 10B has effects and advantages similar to that of the display device 10 in the first embodiment, and thus no repetition is incorporated herein.

Figure 10:
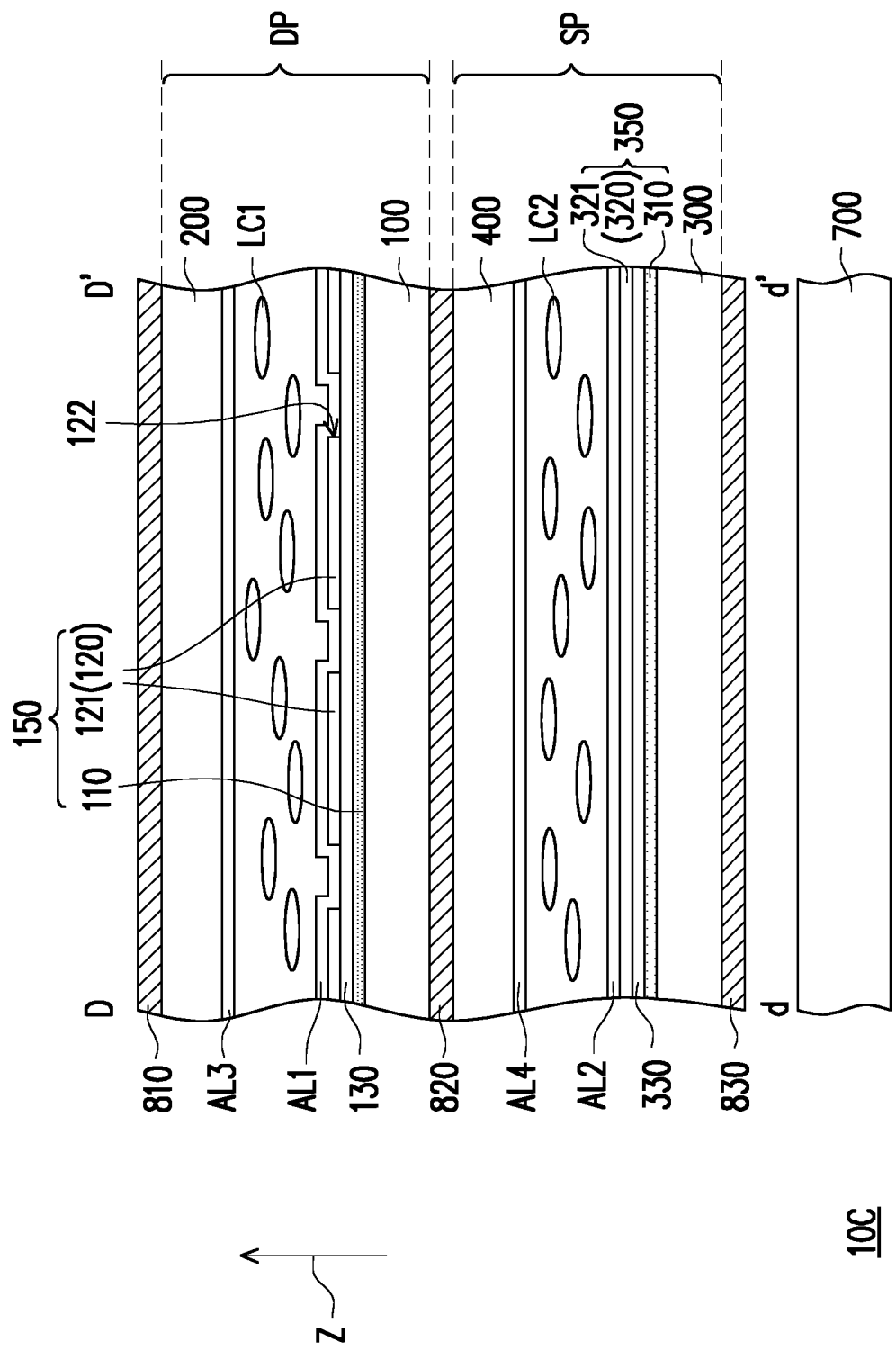
FIG. 10 is a cross-sectional view of a display device according to a fourth embodiment of the disclosure.
Figure 12:
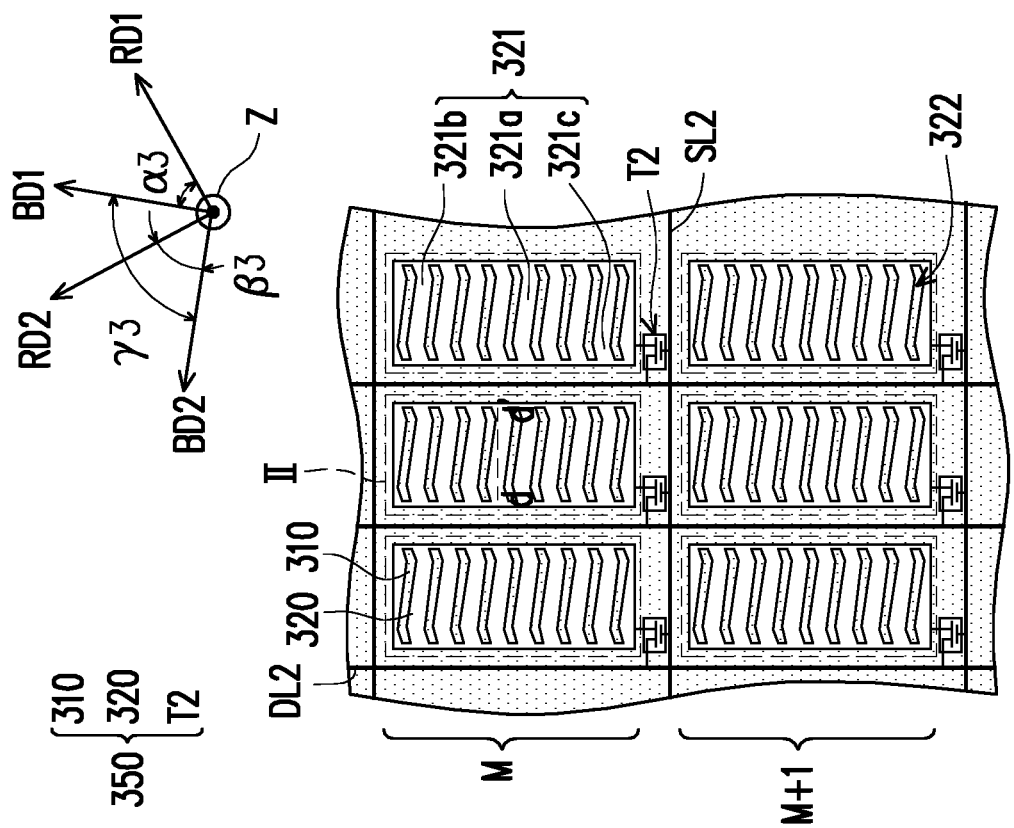
FIG. 12 is a top view of a light valve according to the fourth embodiment of the disclosure.
Figure 11:
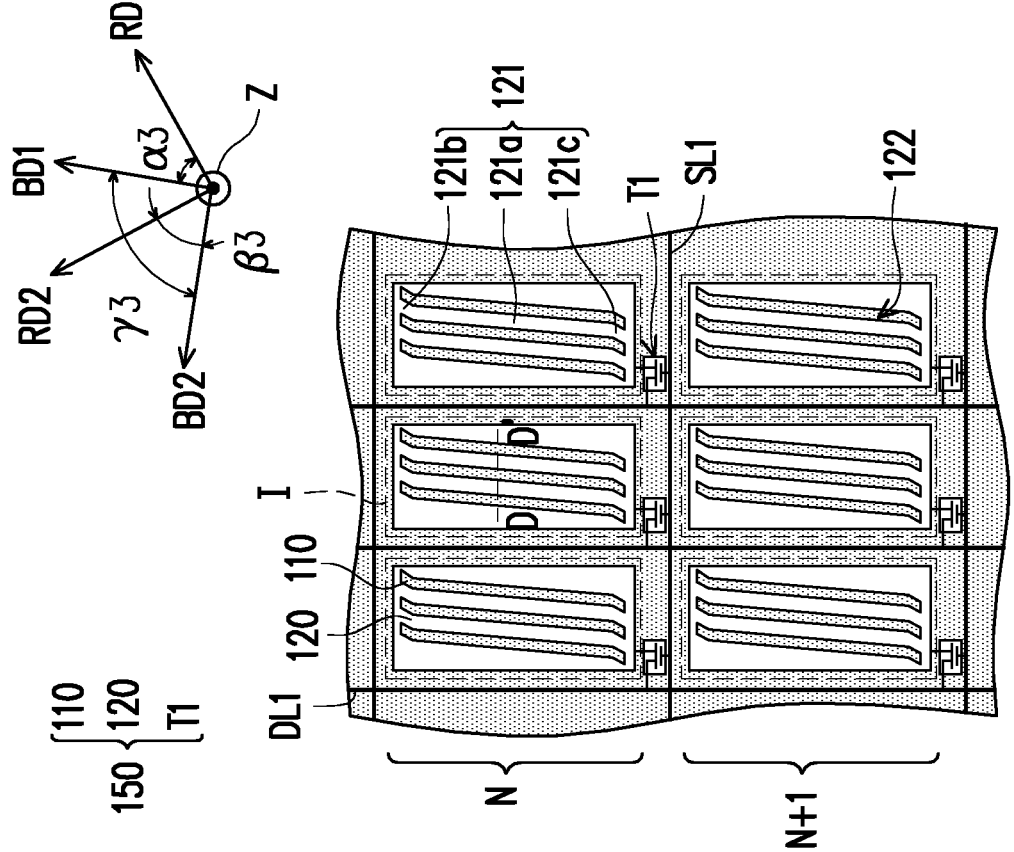
FIG. 11 is a top view of a pixel structure according to the fourth embodiment of the disclosure.

FIG. 10 is a cross-sectional view of a display device 10C according to a fourth embodiment of the disclosure. FIG. 11 is a top view of a pixel structure 150 according to the fourth embodiment of the disclosure. FIG. 12 is a top view of a light valve 350 according to the fourth embodiment of the disclosure. Specifically, FIG. 10 corresponds to line D-D' taken along FIG. 11 and line d-d' taken along FIG. 12.

Referring to FIG. 10, FIG. 11 and FIG. 12, the difference between the display device 10C in the embodiment and the display device 10B in the third embodiment is that the plurality of first liquid crystal molecules LC1 and the plurality of second liquid crystal molecules LC2 of the display device 10C in the embodiment are negative-type liquid crystal molecules, an included angle $\alpha 3$ formed between the first rubbing direction RD1 and the first extending direction BD1 is larger than the included angle $\alpha 2$ in the third embodiment, and an included angle $\beta 3$ formed between the second rubbing direction RD2 and the second extending direction BD2 is larger than the included angle $\beta 2$ in the third embodiment. For example, the included angle $\alpha 3$ between the first rubbing direction RD1 and the first extending direction BD1 satisfies the equation below: $45°\leq\alpha 3\leq 90°$, and the included angle $\beta 3$ between the second rubbing direction RD2 and the second extending direction BD2 satisfies the equation below: $45°\leq\beta 3\leq 90°$, which should not be construed as a limitation to the disclosure.

Referring to FIG. 11 and FIG. 12, the first extending direction BD1 of the display device 10C in the embodiment rotated by an angle (i.e., included angle $\alpha 3$) in clockwise direction is overlapped with the first rubbing direction RD1, and the second extending direction BD2 rotated by an angle (i.e., included angle β3) in clockwise direction is overlapped with the second rubbing direction RD2. In the embodiment, an included angle γ3 is formed between the first extending direction BD1 and the second extending direction BD2, and the included angle γ3 satisfies the equation below: γ3=90°−α3+β3, which should not be construed as a limitation to the disclosure. In the embodiment, the included angle α3 between the first rubbing direction RD1 and the first extending direction BD1 may be equal to the included angle β3 between the second rubbing direction RD2 and the second extending direction BD2, which should not be construed as a limitation to the disclosure. In the embodiment, the display device 10C has effects and advantages similar to that of the display device 10 in the first embodiment, and thus no repetition is incorporated herein.

Figure 13:
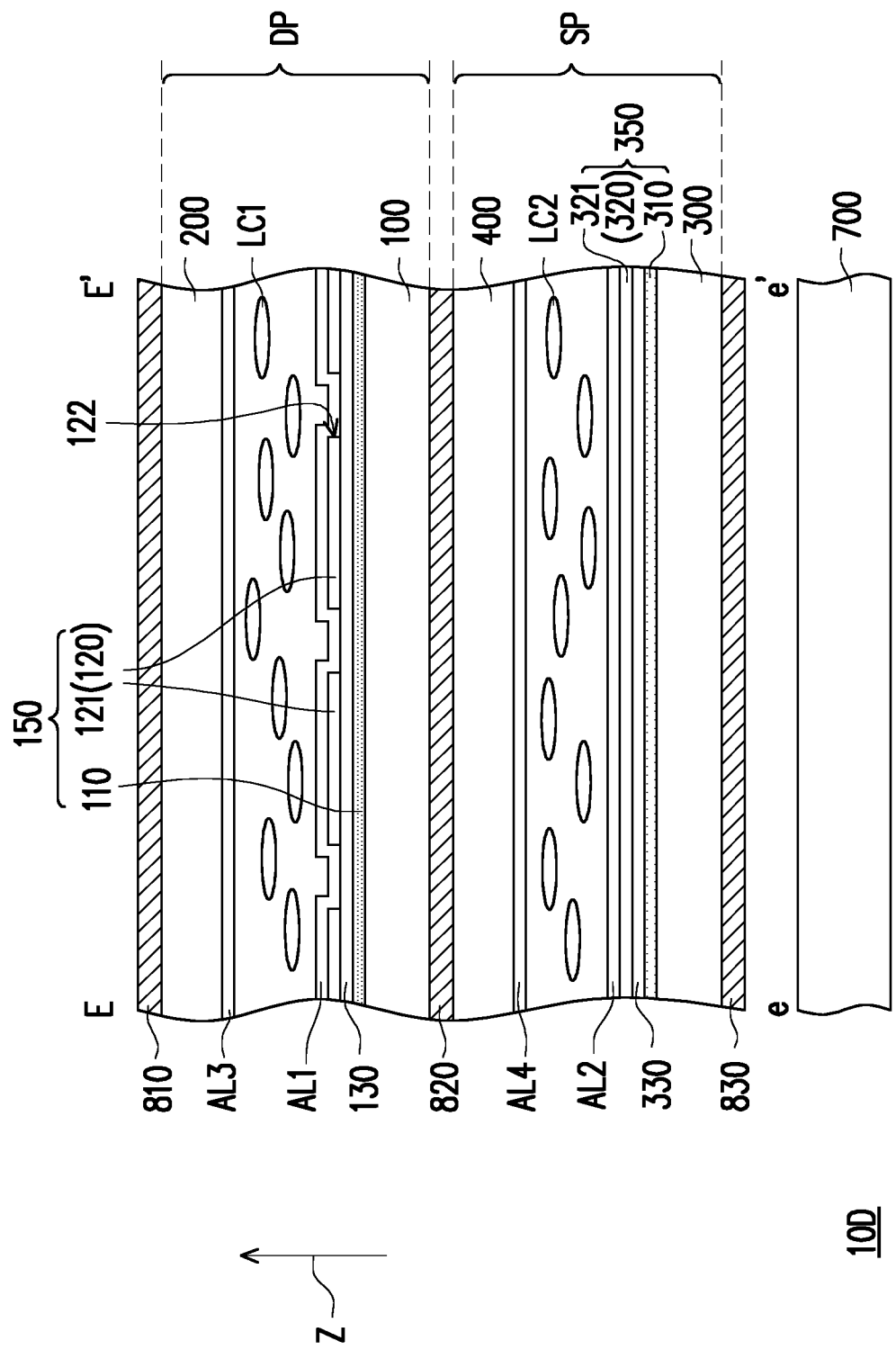
FIG. 13 is a cross-sectional view of a display device according to a fifth embodiment of the disclosure.

FIG. 13 is a cross-sectional view of a display device 10D according to a fifth embodiment of the disclosure. FIG. 14 is a top view of a pixel structure 150 according to the fifth embodiment of the disclosure. FIG. 15 is a top view of a light valve 350 according to the fifth embodiment of the disclosure. Specifically, FIG. 13 corresponds to line E-E' taken along FIG. 14 and line e-e' taken along FIG. 15.

Referring to FIG. 13, FIG. 14 and FIG. 15, the difference between the display device 10D in the embodiment and the display device 10C in the fourth embodiment is that the first extending direction BD1 of the display device 10D in the embodiment rotated by an angle (i.e., included angle α3) in counter-clock wise direction is overlapped with the first rubbing direction RD1, and the second extending direction BD2 rotated by an angle (i.e., included angle β3) in counter-clock wise direction is overlapped with the second rubbing directing RD2. In the embodiment, the included angle γ3 between the first extending direction BD1 and the second extending direction BD2 satisfies the equation below: γ3=90°−β3+α3, which should not be construed as a limitation to the disclosure. In the embodiment, the display device 10D has effects and advantages similar to that of the display device 10 in the first embodiment, and thus no repetition is incorporated herein.

Figure 16:
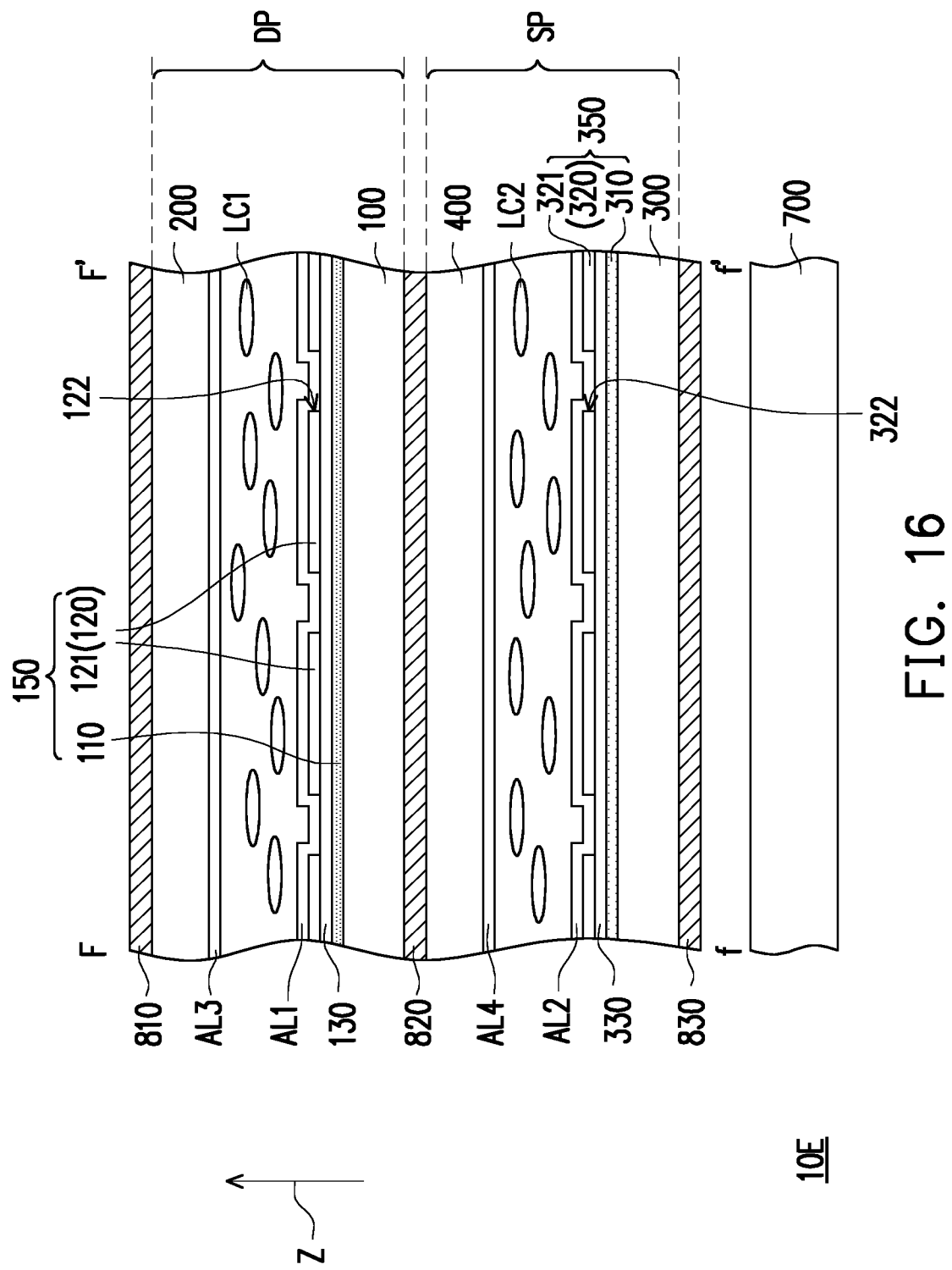
FIG. 16 is a cross-sectional view of a display device according to a sixth embodiment of the disclosure.
Figure 17:
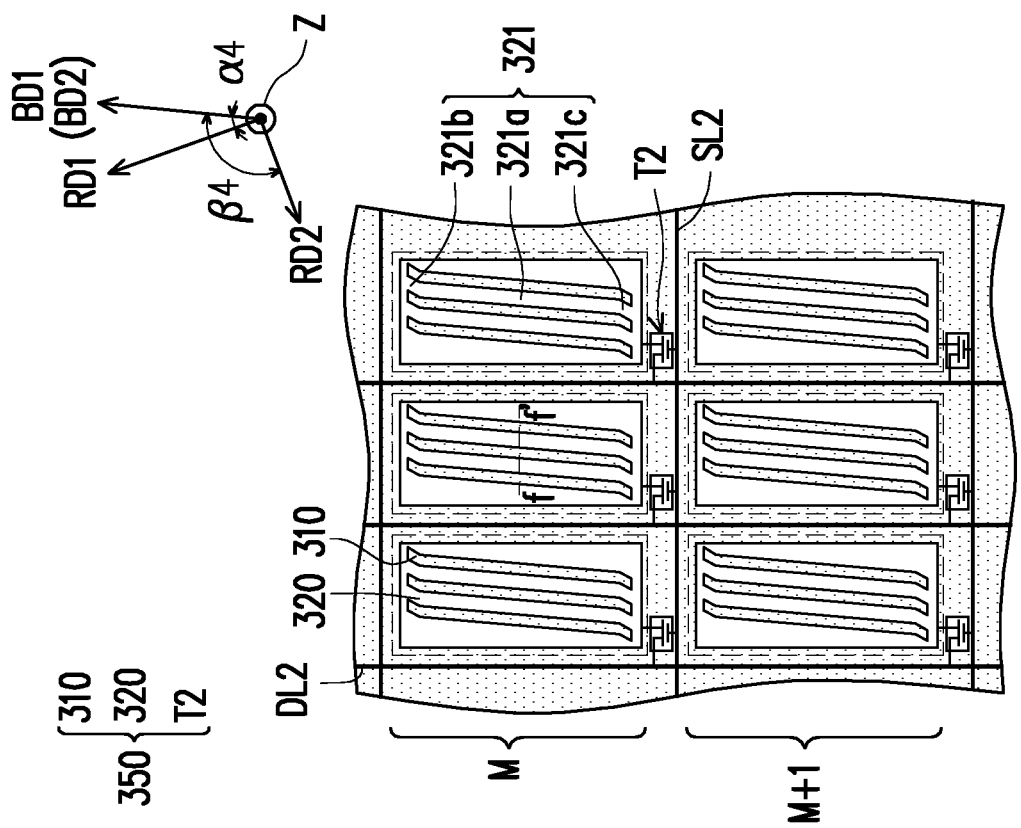
FIG. 17 is a top view of a pixel structure according to the sixth embodiment of the disclosure.
Figure 18:
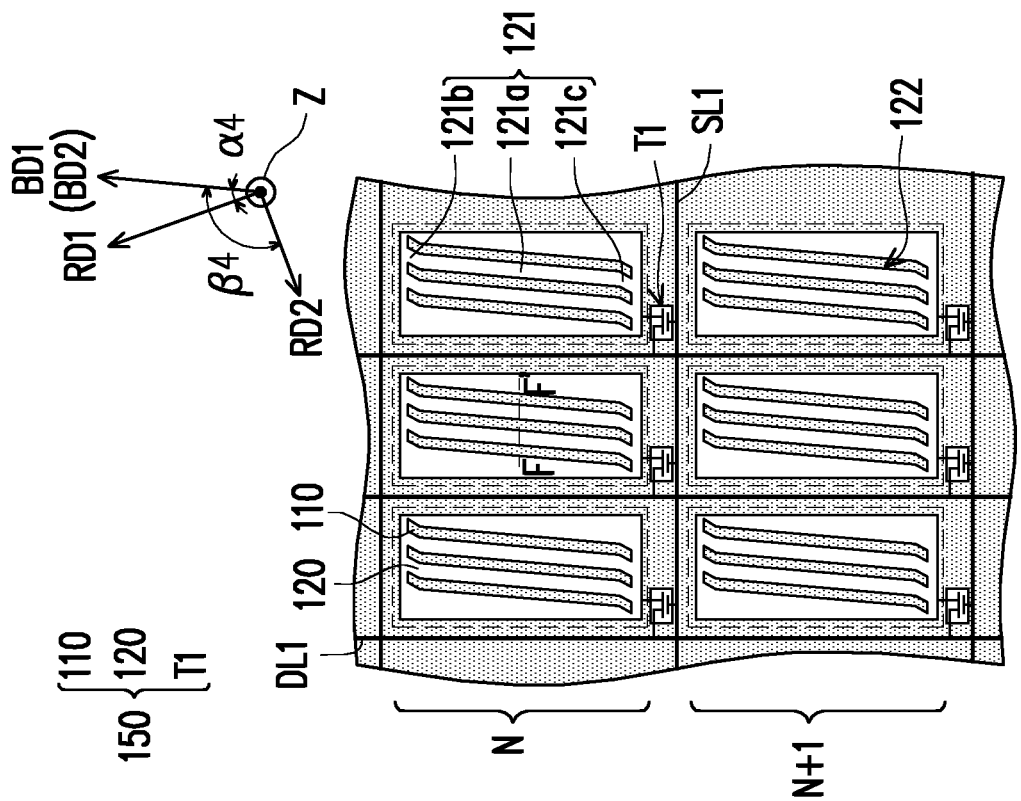
FIG. 18 is a top view of a light valve according to the sixth embodiment of the disclosure.

FIG. 16 is a cross-sectional view of a display device 10E according to a sixth embodiment of the disclosure. FIG. 17 is a top view of a pixel structure 150 according to the sixth embodiment of the disclosure. FIG. 18 is a top view of a light valve 350 according to the sixth embodiment of the disclosure. Specifically, FIG. 16 corresponds to line F-F' taken along FIG. 17 and line f-f' taken along FIG. 18.

Referring to FIG. 16, FIG. 17 and FIG. 18, the difference between the display device 10E in the embodiment and the display device 10A in the second embodiment is that the second extending direction BD2 of the light valve 350 of the display device 10E in the embodiment is parallel with the first extending direction BD1 of the pixel structure 150, the plurality of first liquid crystal molecules LC1 are positive-type liquid crystal molecules, and the plurality of second liquid crystal molecules LC2 are negative-type liquid crystal molecules.

Referring to FIG. 17 and FIG. 18, in the embodiment, an included angle α4 is formed between the first rubbing direction RD1 and the first extending direction BD1, and an included angle β4 is formed between the second rubbing direction RD2 and the second extending direction BD2. Specifically, in the embodiment, the included angle β4 is larger than the included angle α4, and the included angle β4 satisfies the equation below: β4=90°+α4, which should not be construed as a limitation to the disclosure. In the embodiment, the display device 10E has effects and advantages similar to that of the display device 10 in the first embodiment, and thus no repetition is incorporated herein.

Figure 19:
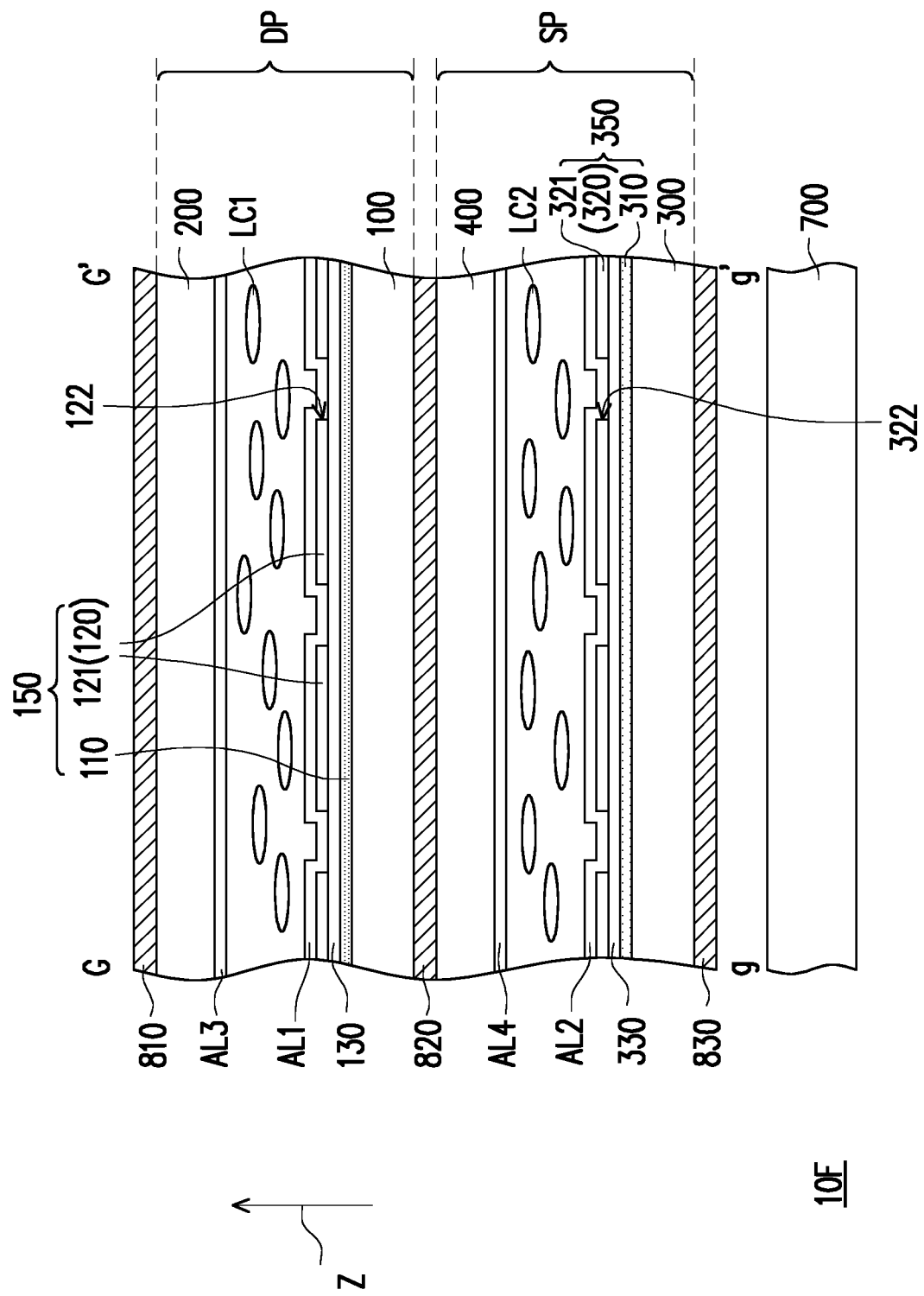
FIG. 19 is a cross-sectional view of a display device according to a seventh embodiment of the disclosure.
Figure 21:
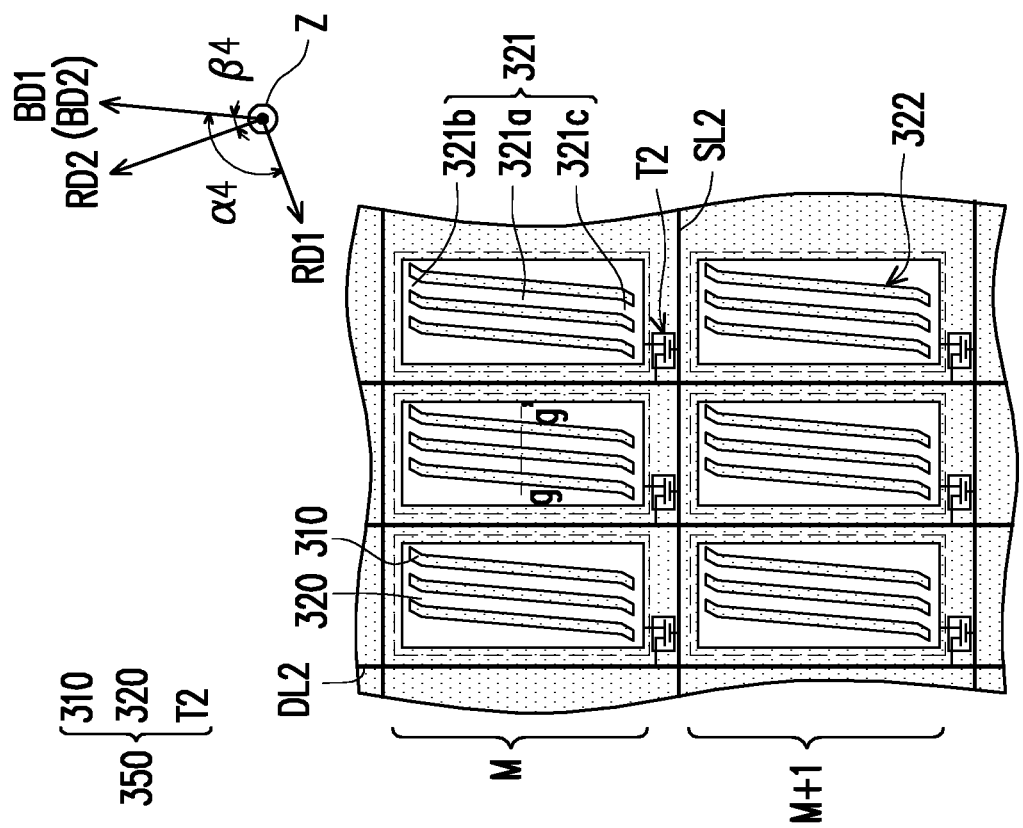
FIG. 21 is a top view of a light valve according to the seventh embodiment of the disclosure.
Figure 20:
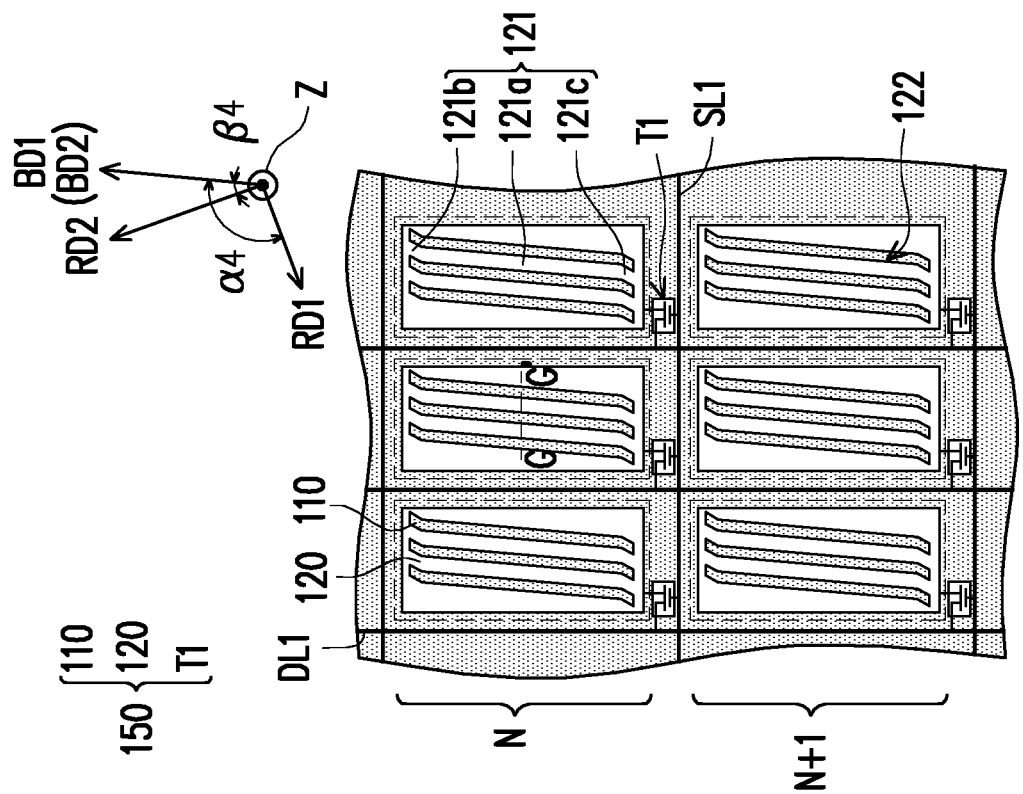
FIG. 20 is a top view of a pixel structure according to the seventh embodiment of the disclosure.

FIG. 19 is a cross-sectional view of a display device 10F according to a seventh embodiment of the disclosure. FIG. 20 is a top view of a pixel structure 150 according to the seventh embodiment of the disclosure. FIG. 21 is a top view of a light valve 350 according to the seventh embodiment of the disclosure. Specifically, FIG. 19 corresponds to line G-G' taken along FIG. 20 and line g-g' taken along FIG. 21.

Referring to FIG. 19, FIG. 20 and FIG. 21, the difference between the display device 10F in the embodiment and the display device 10E in the sixth embodiment is that the plurality of first liquid crystal molecules LC1 of the display device 10F in the embodiment are negative-type liquid crystal molecules, and the plurality of second liquid crystal molecules LC2 are positive-type liquid crystal molecules, which should not be construed as a limitation to the disclosure.

Referring to FIG. 20 and FIG. 21, in the embodiment, an included angle α4 between the first rubbing direction RD1 and the first extending direction BD1 is larger than an included angle β4 between the second rubbing direction RD2 and the second extending direction BD2. Specifically, in the embodiment, the included angle α4 satisfies the equation below: α4=90°+β4. In the embodiment, the display device 10F has effects and advantages similar to that of the display device 10 in the first embodiment, and thus no repetition is incorporated herein.

In summary, in the display device of the embodiments of the disclosure, the pixel electrode of each of the pixel structures of the display panel has the plurality of first branches, the second electrode of each of the light valves of the shutter panel has the plurality of second branches. The plurality of first liquid crystal molecules in the sub-pixel region of the display panel constitute one first domain, the plurality of second liquid crystal molecules in each of the sub-light-modulating regions of the shutter panel constitute one second domain. Since the first extending direction of the display panel and the second extending direction of the shutter panel intersect each other, the one first domain in the sub-pixel region of the display panel and the one corresponding second domain to the sub-light-modulating region of the shutter panel have different optical properties. The first domain and the second domain having different optical properties are overlapped and faun one multi-domain, such that the display device formed of the display panel and the shutter panel stacked onto each other has wide viewing angle property.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A display device, comprising:
a first substrate;
a second substrate, disposed opposite to the first substrate;
a plurality of first liquid crystal molecules, disposed between the first substrate and the second substrate;
a plurality of pixel structures, disposed on the first substrate, wherein each of the pixel structures comprises a pixel electrode and a common electrode, at least one of the pixel electrode and the common electrode com- prises a plurality of first branches, the first branches are extended along a first extending direction;
a third substrate;
a fourth substrate, disposed opposite to the third substrate;
a plurality of second liquid crystal molecules, disposed between the third substrate and the fourth substrate, wherein the first liquid crystal molecules and the second liquid crystal molecules are positive-type liquid crystal molecules, or the first liquid crystal molecules and the second liquid crystal molecules are negative-type liquid crystal molecules;
a plurality of light valves, disposed on the third substrate, wherein each of the light valves comprises a first electrode and a second electrode, at least one of the first electrode and the second electrode comprises a plurality of second branches, the second branches are extended along a second extending direction, the first branches and the second branches are at least partially overlapped, and the first extending direction and the second extending direction intersect each other;
a backlight source, wherein the light valves are disposed between the backlight source and the pixel structures;
a first alignment film, covering the pixel structures and having a first rubbing direction; and
a second alignment film, covering the light valves and having a second rubbing direction, wherein the first rubbing direction and the second rubbing direction are substantially perpendicular to each other, the first liquid crystal molecules and the second liquid crystal molecules are positive-type liquid crystal molecules, an included angle $\alpha 2$ is formed between the first rubbing direction and the first extending direction, and an included angle $\beta 2$ is formed between the second rubbing direction and the second extending direction;
wherein $\alpha 2 < 45"$, and $\beta 2 < 45°$.

2. The display device according to claim 1, further comprising:
a first alignment film, covering the pixel structures and having a first rubbing direction; and
a second alignment film, covering the light valves and having a second rubbing direction, wherein the first rubbing direction and the second rubbing direction are substantially parallel with each other, the first liquid crystal molecules and the second liquid crystal molecules are positive-type liquid crystal molecules, an included angle $\alpha 1$ is formed between the first rubbing direction and the first extending direction, and an included angle $\beta 1$ is formed between the second rubbing direction and the second extending direction.

3. The display device according to claim 2, wherein an included angle $\gamma 1$ is formed between the first extending direction and the second extending direction, and the included angle $\gamma 1$ is equal to a sum of the included angle $\alpha 1$ and the included angle $\beta 1$.

4. A display device, comprising:
a first substrate;
a second substrate, disposed opposite to the first substrate;
a plurality of first liquid crystal molecules, disposed between the first substrate and the second substrate;
a plurality of pixel structures, disposed on the first substrate, wherein each of the pixel structures comprises a pixel electrode and a common electrode, at least one of the pixel electrode and the common electrode comprises a plurality of first branches, the first branches are extended along a first extending direction;
a third substrate;
a fourth substrate, disposed opposite to the third substrate;
a plurality of second liquid crystal molecules, disposed between the third substrate and the fourth substrate, wherein the first liquid crystal molecules and the second liquid crystal molecules are positive-type liquid crystal molecules, or the first liquid crystal molecules and the second liquid crystal molecules are negative-type liquid crystal molecules;
a plurality of light valves, disposed on the third substrate, wherein each of the light valves comprises a first electrode and a second electrode, at least one of the first electrode and the second electrode comprises a plurality of second branches, the second branches are extended along a second extending direction, the first branches and the second branches are at least partially overlapped, and the first extending direction and the second extending direction intersect each other;
a backlight source, wherein the light valves are disposed between the backlight source and the pixel structures;
a first alignment film, covering the pixel structures and having a first rubbing direction; and
a second alignment film, covering the light valves and having a second rubbing direction, wherein the first rubbing direction and the second rubbing direction are substantially perpendicular to each other, the first liquid crystal molecules and the second liquid crystal molecules are positive-type liquid crystal molecules, an included angle $\alpha 2$ is formed between the first rubbing direction and the first extending direction, and an included angle $\beta 2$ is formed between the second rubbing direction and the second extending direction, wherein an included angle $\gamma 2$ is formed between the first extending direction and the second extending direction, and $\gamma 2 = 90° - \alpha 2 + \beta 2$.

5. A display device, comprising:
a first substrate;
a second substrate, disposed opposite to the first substrate;
a plurality of first liquid crystal molecules, disposed between the first substrate and the second substrate;
a plurality of pixel structures, disposed on the first substrate, wherein each of the pixel structures comprises a pixel electrode and a common electrode, at least one of the pixel electrode and the common electrode comprises a plurality of first branches, the first branches are extended along a first extending direction;
a third substrate;
a fourth substrate, disposed opposite to the third substrate;
a plurality of second liquid crystal molecules, disposed between the third substrate and the fourth substrate, wherein the first liquid crystal molecules and the second liquid crystal molecules are positive-type liquid crystal molecules, or the first liquid crystal molecules and the second liquid crystal molecules are negative-type liquid crystal molecules;
a plurality of light valves, disposed on the third substrate, wherein each of the light valves comprises a first electrode and a second electrode, at least one of the first electrode and the second electrode comprises a plurality of second branches, the second branches are extended along a second extending direction, the first branches and the second branches are at least partially overlapped, and the first extending direction and the second extending direction intersect each other;
a backlight source, wherein the light valves are disposed between the backlight source and the pixel structures;
a first alignment film, covering the pixel structures and having a first rubbing direction; and a second alignment film, covering the light valves and having a second rubbing direction, wherein the first rubbing direction and the second rubbing direction are substantially perpendicular to each other, the first liquid crystal molecules and the second liquid crystal molecules are positive-type liquid crystal molecules, an included angle α2 is formed between the first rubbing direction and the first extending direction, and an included angle β2 is formed between the second rubbing direction and the second extending direction, wherein an included angle γ2 is formed between the first extending direction and the second extending direction, and γ2=90°−β2+α2.

6. A display device, comprising:
a first substrate;
a second substrate, disposed opposite to the first substrate;
a plurality of first liquid crystal molecules, disposed between the first substrate and the second substrate;
a plurality of pixel structures, disposed on the first substrate, wherein each of the pixel structures comprises a pixel electrode and a common electrode, at least one of the pixel electrode and the common electrode comprises a plurality of first branches, the first branches are extended along a first extending direction;
a third substrate;
a fourth substrate, disposed opposite to the third substrate;
a plurality of second liquid crystal molecules, disposed between the third substrate and the fourth substrate, wherein the first liquid crystal molecules and the second liquid crystal molecules are positive-type liquid crystal molecules, or the first liquid crystal molecules and the second liquid crystal molecules are negative-type liquid crystal molecules;
a plurality of light valves, disposed on the third substrate, wherein each of the light valves comprises a first electrode and a second electrode, at least one of the first electrode and the second electrode comprises a plurality of second branches, the second branches are extended along a second extending direction, the first branches and the second branches are at least partially overlapped, and the first extending direction and the second extending direction intersect each other;
a backlight source, wherein the light valves are disposed between the backlight source and the pixel structures;
a first alignment film, covering the pixel structures and having a first rubbing direction; and
a second alignment film, covering the light valves and having a second rubbing direction, wherein the first rubbing direction and the second rubbing direction are substantially perpendicular to each other, the first liquid crystal molecules and the second liquid crystal molecules are negative-type liquid crystal molecules, an included angle α3 is formed between the first rubbing direction and the first extending direction, and an included angle β3 is formed between the second rubbing direction and the second extending direction, wherein 45°≤α3<90°, and 45°≤β3≤90°.

7. A display device, comprising:
a first substrate;
a second substrate, disposed opposite to the first substrate;
a plurality of first liquid crystal molecules, disposed between the first substrate and the second substrate;
a plurality of pixel structures, disposed on the first substrate, wherein each of the pixel structures comprises a pixel electrode and a common electrode, at least one of the pixel electrode and the common electrode comprises a plurality of first branches, the first branches are extended along a first extending direction;
a third substrate;
a fourth substrate, disposed opposite to the third substrate;
a plurality of second liquid crystal molecules, disposed between the third substrate and the fourth substrate, wherein the first liquid crystal molecules and the second liquid crystal molecules are positive-type liquid crystal molecules, or the first liquid crystal molecules and the second liquid crystal molecules are negative-type liquid crystal molecules;
a plurality of light valves, disposed on the third substrate, wherein each of the light valves comprises a first electrode and a second electrode, at least one of the first electrode and the second electrode comprises a plurality of second branches, the second branches are extended along a second extending direction, the first branches and the second branches are at least partially overlapped, and the first extending direction and the second extending direction intersect each other;
a backlight source, wherein the light valves are disposed between the backlight source and the pixel structures;
a first alignment film, covering the pixel structures and having a first rubbing direction; and
a second alignment film, covering the light valves and having a second rubbing direction, wherein the first rubbing direction and the second rubbing direction are substantially perpendicular to each other, the first liquid crystal molecules and the second liquid crystal molecules are negative-type liquid crystal molecules, an included angle α3 is formed between the first rubbing direction and the first extending direction, and an included angle β3 is formed between the second rubbing direction and the second extending direction, wherein an included angle γ3 is formed between the first extending direction and the second extending direction, and γ3=90°−β3+α3.

8. A display device, comprising:
a first substrate;
a second substrate, disposed opposite to the first substrate;
a plurality of first liquid crystal molecules, disposed between the first substrate and the second substrate;
a plurality of pixel structures, disposed on the first substrate, wherein each of the pixel structures comprises a pixel electrode and a common electrode, at least one of the pixel electrode and the common electrode comprises a plurality of first branches, the first branches are extended along a first extending direction;
a third substrate;
a fourth substrate, disposed opposite to the third substrate;
a plurality of second liquid crystal molecules, disposed between the third substrate and the fourth substrate, wherein the first liquid crystal molecules and the second liquid crystal molecules are positive-type liquid crystal molecules, or the first liquid crystal molecules and the second liquid crystal molecules are negative-type liquid crystal molecules;
a plurality of light valves, disposed on the third substrate, wherein each of the light valves comprises a first electrode and a second electrode, at least one of the first electrode and the second electrode comprises a plurality of second branches, the second branches are extended along a second extending direction, the first branches and the second branches are at least partially overlapped, and the first extending direction and the second extending direction intersect each other;

a backlight source, wherein the light valves are disposed between the backlight source and the pixel structures;

a first alignment film, covering the pixel structures and having a first rubbing direction; and a second alignment film, covering the light valves and having a second rubbing direction, wherein the first rubbing direction and the second rubbing direction are substantially perpendicular to each other, the first liquid crystal molecules and the second liquid crystal molecules are negative-type liquid crystal molecules, an included angle $\alpha 3$ is formed between the first rubbing direction and the first extending direction, and an included angle $\beta 3$ is formed between the second rubbing direction and the second extending direction, wherein an included angle $\gamma 3$ is formed between the first extending direction and the second extending direction, and $\gamma 3 = 90° - \alpha 3 + \beta 3$.

9. The display device according to claim 1, wherein each of the first branches has a first straight line portion extended along the first extending direction, each of the second branches has a second straight line portion extended along the second extending direction, an included angle $\gamma$ is formed between the first extending direction and the second extending direction, and $\gamma \geq 20°$.

10. The display device according to claim 1, wherein each of the first branches has a first straight line portion extended along the first extending direction, a ratio of an area of each of the first straight line portions to an area of each of the first branches is larger than 80%; each of the second branches has a second straight line portion extended along the second extending direction, and a ratio of an area of each of the second straight line portions to an area of each of the second branches is larger than 80%.

11. The display device according to claim 10, wherein the first branches of each of the pixel structures of an Nth row are parallel with the first branches of each of the pixel structures of an N+1th row, wherein the second branches of each of the light valves of an Mth row are parallel with the second branches of each of the light valves of an M+1th row, and wherein N and M are positive integers.

* * * * *